(12) United States Patent
Van Veluw et al.

(10) Patent No.: US 11,066,279 B2
(45) Date of Patent: Jul. 20, 2021

(54) MOTION COMPENSATING CRANE FOR USE ON AN OFFSHORE VESSEL

(71) Applicant: ITREC B.V., Schiedam (NL)

(72) Inventors: Cornelis Martinus Van Veluw, Scheidam (NL); Joop Roodenburg, Schiedam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 16/607,658

(22) PCT Filed: Apr. 20, 2018

(86) PCT No.: PCT/NL2018/050251
§ 371 (c)(1),
(2) Date: Oct. 23, 2019

(87) PCT Pub. No.: WO2018/199743
PCT Pub. Date: Nov. 1, 2018

(65) Prior Publication Data
US 2020/0299108 A1  Sep. 24, 2020

(30) Foreign Application Priority Data

Apr. 24, 2017  (NL) .................................... 2018775
May 2, 2017   (NL) .................................... 2018833

(51) Int. Cl.
*B66C 13/08*   (2006.01)
*B66C 23/52*   (2006.01)
(Continued)

(52) U.S. Cl.
CPC .............. *B66C 13/08* (2013.01); *B66C 13/02* (2013.01); *B66C 23/185* (2013.01); *B66C 23/52* (2013.01); *B66C 23/66* (2013.01); *B66C 2700/03* (2013.01)

(58) Field of Classification Search
CPC ......... B66C 23/52; B66C 23/54; B66C 23/64; B66C 23/66; B66C 23/82; B66C 23/185;
(Continued)

(56) References Cited

U.S. PATENT DOCUMENTS 6,523,491 B1 *   2/2003  Moise, II ................ B63B 35/00
                                                           114/265
2004/0007552 A1 *  1/2004  Franzen .................. B66C 23/10
                                                           212/232
(Continued)

FOREIGN PATENT DOCUMENTS

DE    10 2010 015 412 A1   10/2011
EP           2194017 A1 *   6/2010  ............. B66C 23/64
(Continued)

OTHER PUBLICATIONS

International Search Report, issued in PCT/NL2018/050251, dated Aug. 2, 2019.
(Continued)

*Primary Examiner* — Michael R Mansen
*Assistant Examiner* — Juan J Campos, Jr.
(74) *Attorney, Agent, or Firm* — Birch, Stewart, Kolasch & Birch, LLP

(57) ABSTRACT

A motion compensating crane for use on an offshore vessel having a hull with a design waterline, wherein the crane includes a revolving superstructure, a main boom mounted to the revolving superstructure and pivotally connected at an inner end thereof about a substantially horizontal boom pivot axis to the revolving superstructure, the main boom having a tip end remote from the inner end, a main boom luffing assembly adapted to set an angle of the main boom relative to the superstructure within a main boom working angle range, a rigid jib frame pivotally connected to the tip end of the main boom about a substantially horizontal jib
(Continued)

frame pivot axis, and a level setting assembly adapted to set the rigid jib frame in a levelled position whilst the main boom has an angle within the main boom working angle range. The rigid jib frame is provided with a set of parallel X-direction tracks which are substantially horizontal in the levelled position of the rigid jib frame. The crane further has a mobile carrier supported by the X-direction tracks and movable by a motor powered X-motion displacement actuator assembly. The mobile carrier is provided with one or multiple parallel Y-direction tracks and a mobile jib hoist cable suspension member is supported by the one or more Y-direction tracks and movable relative thereto.

19 Claims, 11 Drawing Sheets

(51) Int. Cl.
  *B66C 23/66* (2006.01)
  *B66C 13/02* (2006.01)
  *B66C 23/18* (2006.01)
(58) Field of Classification Search
  CPC ..... B66C 13/02; B66C 13/08; B66C 2700/03; B63B 27/10; B63B 35/03
  See application file for complete search history.

(56) References Cited

U.S. PATENT DOCUMENTS

| | | | |
|---|---|---|---|
| 2012/0241404 A1* | 9/2012 | Bobeck | B66C 23/82 212/300 |
| 2015/0337798 A1* | 11/2015 | Clymans | F03D 13/10 212/273 |
| 2015/0368075 A1* | 12/2015 | Clymans | B66C 23/185 212/273 |
| 2021/0032079 A1* | 2/2021 | Vehmeijer | B66C 13/18 |

FOREIGN PATENT DOCUMENTS

| | | | | |
|---|---|---|---|---|
| EP | 2 365 211 A1 | | 9/2011 | |
| GB | 1226936 A | * | 3/1971 | ............ B63B 27/10 |
| NL | 2017937 B1 | | 6/2018 | |
| WO | WO 2006/076920 A1 | | 7/2006 | |
| WO | WO 2015/199543 A1 | | 12/2015 | |
| WO | WO 2018/106105 A1 | | 6/2018 | |

OTHER PUBLICATIONS

Written Opinion of the International Searching Authority, issued in PCT/NL2018/050251, dated Aug. 2, 2019.

* cited by examiner

MOTION COMPENSATING CRANE FOR USE ON AN OFFSHORE VESSEL

FIELD OF THE INVENTION

The present invention relates to the field of offshore vessel cranes.

BACKGROUND OF THE INVENTION

In particularly attractive embodiments the inventive crane is envisaged for use on a floating vessel, so with the crane being operational whilst the vessel is subjected to wave induced motions. As explained herein the inventive aspects are also applicable to vessels having a crane that is operated whilst the vessel is not in floating condition, e.g. a jacked up jack-up vessel having a crane as described herein.

In the field of offshore wind turbines the need exists for enhanced efficiency and cost reduction, e.g. in view of time and expenses related to maintenance work to be done on the ever growing installed base of offshore wind turbines, e.g. in the North Sea, Baltic, US coastal waters, etc.

Maintenance work may for example include the handling by a tall crane of components "at the height of the nacelle", which includes for example the handling of the nacelle itself, and/or one or more components that are housed in a nacelle and/or mounted on the nacelle, e.g. gearbox, generator, hub, and/or blades, of an offshore wind turbine.

Current designs of offshore wind turbines propose or already have the nacelle at a height of more than 100 meters above sea level, e.g. at 120 meters or more. Therefore the handling of such components requires a very tall crane. Also the mass of such components can be significant, in the range of 5-150 tons, with components like the generator and gearbox being in the upper portion of this range.

The wind turbine may be of the type that is installed on the seabed, e.g. by a monopile or a jacket foundation or the like. In another design the wind turbine is embodied on a floating structure, so with the wind turbine also being fully exposed to wave action and moving due to said wave action.

In a common approach the vessel is a jack-up vessel that is positioned close to the wind turbine and then the legs are extended and the vessel is lifted, at least in part but mostly entirely, to provide a stabilized situation for the crane operation.

The jack-up process and the later lowering of a jack-up crane vessel is time consuming and in the jacked-up position significant constraints are placed on wave height, so that when the weather worsens the vessel must be brought in floating condition well in advance of the actual weather change. This reduces the effective operational window of such a vessel for offshore wind turbine related activities. Also, generally, sailing speed is usually less than of ordinary vessels.

It is noted that the invention is primarily envisaged for the offshore wind turbine field, so for maintenance, and also for installation and/or decommission of wind turbines. However the invention may also be of use in other offshore applications, like oil & gas related jobs, civil engineering operations, etc.

OBJECT OF THE INVENTION

The present invention aims to provide an improved crane for use onboard an offshore vessel or at least an alternative for existing cranes for such use.

SUMMARY OF THE INVENTION

A first aspect of the present invention provides a motion compensating crane for use on an offshore vessel in floating condition having a hull with a design waterline, e.g. for use in handling of one or more offshore wind turbine components, e.g. the nacelle and/or one or more components that are housed in a nacelle and/or mounted on the nacelle, e.g. gearbox, generator, hub and/or blades, of an offshore wind turbine, e.g. for installation and/or maintenance of an offshore wind turbine.

The first aspect of the present invention also provides a motion compensating crane for use on an offshore vessel having a hull with a design waterline, e.g. for use in handling of one or more offshore wind turbine components, e.g. the nacelle and/or one or more components that are housed in a nacelle and/or mounted on the nacelle, e.g. gearbox, generator, hub and/or blades, of an offshore wind turbine, e.g. for installation and/or maintenance of an offshore wind turbine.

In an embodiment the motor powered X-motion displacement actuator assembly, the motor powered Y-motion displacement actuator assembly, and the Z-direction heave motion compensation device are configured to each provide independent control of the X motion of the mobile carrier, of the Y motion of the mobile jib hoist cable suspension member, and of the Z-direction heave motion compensation of the object suspension device, respectively.

In an embodiment the motor powered X-motion displacement actuator assembly comprises an X-direction winch and cable assembly, comprising at least one X-direction cable connected to the mobile carrier and an associated winch so as to move the mobile carrier in the X-direction relative to the X-direction tracks.

In an embodiment the X-direction winch and cable assembly comprises a first X-direction cable attached to the mobile carrier at a first attachment point thereof in proximity of a first X-direction track of the rigid jib frame, and a second X-direction cable attached to the mobile carrier at a second attachment point thereof in proximity of a second X-direction track of the rigid jib frame, wherein the X-direction winch and cable assembly comprises a motor powered X-direction winch having a rotatable winch drum with first, second, third, and fourth drum sections, wherein a first end of the first X-direction cable is wound onto said first drum section, wherein a second end of the first direction cable is wound onto said second drum section in opposite sense to the winding of the first end of the first X-direction cable, and wherein a first end of the second X-direction cable is wound onto said third section, and wherein a second end of the second X direction cable is wound onto said fourth section in opposite sense to the winding of the first end of the second X-direction cable.

In an embodiment the motor powered Y-motion displacement actuator assembly comprises a Y-direction winch and cable assembly, comprising at least one Y-direction cable connected to the mobile hoisting cable suspension member and an associated winch so as to move said mobile hoisting cable suspension member in said Y-direction relative to said one or more Y-direction tracks.

In an embodiment the Y-direction winch and cable assembly has a single Y-direction cable that is attached to said mobile hoisting cable suspension member and an associated motor power Y-direction winch having a rotatable winch drum with a first and section drum section, wherein a first end of the single Y-direction cable is wound onto said first drum section and wherein a second end of the single Y-direction cable is wound onto said second drum section in opposite sense to the winding of the first end of the Y-direction cable.

In an embodiment the mobile jib hoist cable suspension member comprises a first top sheave, a second top sheave, a third top sheave, and a fourth top sheave, wherein the mobile carrier is provided with first and second cable guiding sheaves at opposite locations thereon seen in Y-direction. The jib hoist cable passes from a first end thereof in a positive X-direction to said first cable guiding sheave on the mobile carrier, and then from said first cable guiding sheave on the mobile carrier to the first top sheave, via the first bottom sheave to the second top sheave, and from the second top sheave to the second cable guiding sheave on the mobile carrier, wherein the rigid jib frame is provided with third and fourth cable guiding sheaves, each in proximity of an end of a respective second and first X-direction track of the rigid jib frame, and wherein the jib hoist cable extends from the second cable guiding sheave on the mobile carrier in said positive X-direction to said third cable guiding sheave on said rigid jib frame, and from said third cable guiding sheave to said fourth cable guiding sheave. The mobile carrier is further provided with fifth and sixth cable guiding sheaves, the fifth cable guiding sheave in proximity of the first cable guiding sheave and the sixth cable guiding sheave in proximity of the second cable guiding sheave, wherein the jib hoist cable extends from said fourth cable guiding sheave on the rigid jib frame in a negative X-direction to the fifth cable guiding sheave on the mobile carrier and passes from the fifth cable guiding sheave to the third top sheave, down to the second bottom sheave and up to the fourth top sheave, and from said fourth top sheave to the sixth cable guiding sheave. The jib hoist cable extends from said sixth cable guiding sheave in a negative X-direction to said second end of the hoisting cable. At least one of said first and second ends of the jib hoist cable is connected to a hoisting winch.

In an embodiment a first jib hoist winch is connected to said first end, e.g. said first jib hoist winch having a drum onto which said first end is wound, wherein a second jib hoist winch is connected to said second end, e.g. a second jib hoist winch having a drum onto which said second end is wound, wherein the mobile jib hoist cable suspension member comprises a third and fourth top sheave having a horizontal sheave axis, wherein said object suspension member comprises a second bottom sheave, wherein said jib hoist cable extends in a double fall arrangement between third and fourth top sheaves and said second bottom sheave, and therefore in a four fall arrangement between said mobile jib hoist cable suspension member and said object connection member.

In an embodiment at least one jib hoist winch is an active motion compensation winch (AHC winch).

In an embodiment the motor powered X-motion displacement actuator assembly and/or the motor powered Y-motion displacement actuator assembly comprises a rack-and-pinion drive or a linear cylinder drive, e.g. with one or more hydraulic cylinders.

In an embodiment the one or more X-direction tracks are embodied to provide an X-motion range of the mobile carrier of at least 3 meters, e.g. at least 4 meters, e.g. between 5 and 8 meters, e.g. approximately 6 meters.

In an embodiment the one or more Y-direction tracks are embodied to provide an Y-motion range of the mobile hoisting cable suspension member of at least 2 meter, e.g. at least 3 meters, e.g. between 3 and 5 meters, e.g. approximately 4 meters.

In an embodiment the rigid jib frame has an inner end that is pivotally secured to said tip end of the main boom, and an outer end remote from said tip end.

In an embodiment the rigid jib frame has a first X-direction frame beam provided with said first X-direction track and a parallel second X-direction frame beam provided with said second X-direction track, e.g. said first and second X-direction frame beams each embodied as a hollow box beam externally provided with said respective X-direction track.

In an embodiment said rigid jib frame is provided with an inner transverse frame beam extending in said Y-direction and interconnecting respective inner ends of the first and second X-direction frame beams, In an embodiment the rigid jib frame is provided with an outer transverse frame beam extending in said Y-direction and interconnecting respective outer ends of the first and second X-direction frame beams.

In an embodiment the rigid jib frame is provided with one or more diagonal bracing members, e.g. the rigid jib frame having first and second X-direction beam members and at least one of inner and outer transverse beam members interconnecting the first and second X-direction beam members at the inner and outer ends thereof respectively, e.g. to form corners of a substantially rectangular frame portion, e.g. the rigid frame having two diagonal bracing members extends between diagonally opposed corners of the rectangular frame portion.

In an embodiment the tip end of the main boom is provided with first and second hinge members that are spaced apart in said Y-direction, e.g. said first hinge member being located in proximity of the inner end of the first X-direction frame beam of the rigid jib frame, e.g. at the inner end of the first X-direction frame member, and the second hinge member being located in proximity of the inner end of the second X-direction frame beam of the rigid jib frame, e.g. at the inner end of the second X-direction frame member.

In an embodiment the tip end of the main boom is provided with a torsionally stable platform In an embodiment the crane is provided with:
 a jib frame strut structure having an inner end that is pivotally connected to the rigid jib frame in proximity of the pivot axis thereof and having an outer end,
 at least one forestay member extending from said outer end of the jib frame strut structure an attachment point on the rigid jib frame remote from the pivot axis thereof,
 a main boom strut structure having an inner end connected to the main boom in proximity of the tip end thereof,
 a main boom backstay extending between an outer end of the main boom strut structure and a lower portion of the main boom,
 a variable length stay mechanism provided between the main boom strut structure and the jib strut structure, wherein said variable length stay mechanism forms said level setting assembly and is adapted to set the rigid jib frame in a levelled position whilst the main boom has an angle within said main boom working angle range, In an embodiment two forestay members extend between the jib frame strut structure and respective attachment points on the rigid jib frame and/or wherein two backstay members extend between the main boom strut structure and the lower portion of the main boom.

In an embodiment the main boom is a single latticed main boom.

In an embodiment the main boom has a length of at least 75 meters, e.g. between 75 and 160 meters.

In an embodiment the main boom has a longitudinal portion, or is over its length, composed of two parallel main boom legs, preferably latticed boom legs.

In another embodiment the main boom is of the A-frame type.

In an embodiment of the crane of claim 1 the main boom is an A-frame type main boom, the inner end thereof being pivotally connected to a base structure that is affixed to the hull of the vessel. In this design the main boom will always be governed by the heading of the vessel, which is a constraint compared to a design with a revolving superstructure. However this design may allow for a very stiff main boom of the required length or height, e.g. at relatively reduced mass of the main boom, and therefore have advantages of its own.

In an embodiment the rigid jib frame has a single cantilevered X frame beam that is provided with the at least one X-direction track. This design may save weight and thus be favourable in view of dynamic properties of the crane.

In an embodiment at least a top portion of the main boom is embodied as a hollow box type top portion as this provides enhanced stiffness at comparable reduced weight. The remainder of the main boom can then for example be made with a latticed design.

In an embodiment the hoist capacity of the jib hoist system is at least 150 mt at a radius between 30 and 50 meters from the vertical axis of the revolving superstructure.

In an embodiment the main boom is provided with one or more tugger winches, e.g. in proximity of the tip end of the main boom and/or on the jib frame, each tugger winch being provided with a tugger cable attachable to the object and/or to the object suspension device that is suspended from the jib hoist cable.

In an embodiment an active motion damping mechanism is mounted to the jib frame or to the main boom in proximity of the tip of the main boom, which active motion damping mechanism comprises a solid motion damping ballast which is movable in the motion damping direction relative to the jib frame or the tip of the mast and a damping ballast drive and control system configured to cause and control the movements of the solid damping ballast, e.g. in response to output of a motion detection sensor. For example a first solid motion damping ballast is configured to be moved in X-direction and/or a second solid motion damping ballast is configured to be moved in Y-direction.

In an embodiment it is envisaged that the active motion damping mechanism is operated in the relatively short time periods of pick-up and landing a load, e.g. of a component that is removed from the nacelle or placed in the nacelle.

For example the e.g. the active motion damping mechanism is releasably mounted to said jib frame or to the main boom in proximity of the tip of the main boom, for example so that the effective hoist capacity can be enlarged by removal of the active motion damping mechanism when a heavy load needs to be handled.

In an embodiment the crane has a main hoist system comprising a top sheaves assembly arranged in proximity of the tip end of the main boom, a main hoist block having multiple sheaves, a main hoist cable and a main hoist winch, wherein the main hoist block is suspended from the top sheaves assembly by means of the main hoist cable in a multiple falls arrangement.

In an embodiment the main hoist block is an elongated hoist block having opposed end portions, wherein the main hoist system comprises a left-hand top sheave set and a right-hand top sheave set that are spaced apart on said tip end of the main boom in said Y-direction, wherein the elongated hoist block is provided with a left-hand bottom sheave set and a right-hand bottom sheave set suspended respectively in a multi-fall arrangement from said left-hand and right-hand top sheaves assembly with said elongated hoist block extending in Y-direction, and wherein an object connection member, e.g. a crane hook, is arranged centrally below the elongated hoist block.

In an embodiment the main hoist system of the crane has a hoist capacity of at least 400 mt at a radius between 30 and 50 meters from the vertical axis of the revolving superstructure.

In an embodiment the base structure comprises a cylindrical tub or a pedestal extending upward from a deck of the vessel, and wherein the slew bearing is mounted at a top end of the cylindrical tub or pedestal. The pedestal may have a square or rectangular cross section.

In an embodiment the superstructure comprises a crane housing and a gantry structure erected on and supported by the crane housing, wherein the crane housing is mounted via the slew bearing on the base structure, and wherein the main boom luffing assembly of the crane comprises a main boom luffing cable and winch system comprising a luffing cable extending between said gantry structure and the main boom adapted to pivot the boom up and down by means of a luffing winch and to set the main boom in one or more desired angles within said working range.

In an embodiment the crane housing comprises one or more main boom supports at a front side of the crane housing and wherein the gantry structure comprises a substantially vertical rear gantry frame member connected at a lower end thereof to the rear side of the crane housing, and wherein the gantry structure comprises front gantry frame member attached at an upper end thereof to the rear gantry frame member and extending inclined forward to an attachment on the crane housing in proximity of the one or more main boom supports.

In an embodiment the crane housing comprises a left-hand main boom support and a right-hand main boom support spaced from one another in said Y-direction.

In an embodiment the crane is provided with one or more jib cable orientation sensors, e.g. one or more camera's or inclination sensors, that are adapted to sense the actual orientation of one or more falls of the jib hoist cable relative to the jib frame, e.g. in view of wind deflecting the object and/or object connector member from a position vertically below the mobile jib hoist cable suspension member.

In an embodiment the crane is provided with one or more nacelle position detectors that are adapted to sense the actual position of the nacelle and/or one or more components in or on the nacelle relative to the jib frame, e.g. wherein said nacelle position detectors comprises one or more radar devices.

In an embodiment the crane is provided with one or more sensors that are adapted to sense an actual deflection of the main boom, e.g. one or more strain gauges fitted on the main boom, In an embodiment an inertial measurement device is mounted at the tip of the main boom or on said jib frame, said inertial measurement device providing one or more reference signal on the basis of which control signals for said motor powered X-motion displacement actuator assembly, said motor powered Y-motion displacement actuator assembly, and said Z-direction heave motion compensation device are computed and provided, each thereof being configured to independently control of the X motion of the mobile carrier, of the Y motion of the mobile jib hoist cable suspension member, and of the Z-direction heave motion compensation of the object suspension device.

In an embodiment the motion compensating support device controller is linked to a satellites based positioning system, e.g. a GPS system, that provides coordinates based on satellite signals. For example a corresponding receiver is mounted at the tip end of the boom and/or on the jib frame, and/or on the suspension member, to provide position information of the respective part of the crane that may be used in control of the motion compensating support device. A beacon or fixed reference could be mounted on the wind turbine, e.g. on the nacelle, in view of a differential GPS system that provides for enhanced accuracy of the determination of the position.

In an embodiment at least three jib hoist cables extend each from a respective jib hoist winch to the load connector, with the cables extending to define a reverse pyramid diverging upward from the load connector.

In an embodiment the load connector comprises an upper part suspended from one or more jib hoist cable and a rotatable lower part, e.g. a hook, that is configured to connect to the load and is rotatable relative to the upper part of the load connector. This allows to rotate the object load around a vertical axis of the load connector, wherein preferably the rotating of said lower part relative to said upper part is controlled by means of the control device, e.g. a motorized rotation drive if present, so that said rotating and thereby the actual angular position of the load in its horizontal plane is controlled thereby.

The first aspect of the invention also relates to a vessel provided with such a crane and to a method of handling a load, e.g. as described herein, using the crane and/or the vessel.

A second aspect of the invention relates to a motion compensating crane for use on an offshore vessel having a hull with a design waterline, e.g. for use in handling of one or more offshore wind turbine components, e.g. the nacelle and/or one or more components that are housed in a nacelle and/or mounted on the nacelle, e.g. gearbox, generator, hub and/or blades, of an offshore wind turbine, e.g. for installation and/or maintenance of an offshore wind turbine, wherein the crane comprises:
  a main boom pivotally connected at an inner end thereof about a substantially horizontal boom pivot axis, said main boom having a tip end remote from said inner end;
  a main boom luffing assembly adapted to set an angle of the main boom within a main boom working angle range,
wherein the main boom, preferably, has a length and a main boom working angle range such that the tip end thereof is positionable in a position wherein the tip end is at least 100 meters above the design waterline of the hull of the vessel,
  a mobile hoist cable suspension member,
  a hoist winch and a hoist cable driven by said hoist winch, which hoist cable depends from said mobile hoist cable suspension member, wherein an object suspension device is suspended from said hoist cable,
wherein the mobile hoist cable suspension member is supported by a motion compensating support device that is fitted to the tip end of the main boom, which motion compensating support device comprises motor powered motion displacement actuator assemblies and a motion compensating support device controller, which motion compensating support device is configured to provide motion compensation is at least two directions, e.g. in orthogonal X-Y directions,
characterized in that the crane is provided an active motion damping mechanism which is mounted to the motion compensating support device, e.g. the jib frame described herein, or to the main boom in proximity of the tip of the main boom, which active motion damping mechanism comprises a motion damping ballast which is movable in the motion damping direction relative to the motion compensating support device or the main boom and a damping ballast drive and control system configured to cause and control the movements of the motion damping ballast, e.g. in response to output of a motion detection sensor. For example a first motion damping ballast is configured to be moved in X-direction and/or a second motion damping ballast is configured to be moved in Y-direction.

The motion compensating support device that is fitted to the tip end of the main boom may be embodied as discussed with reference to the first aspect of the invention. In an alternative design the motion compensating support device may comprise a scissors mechanism operable in horizontal plane and levelled by a level setting mechanism.

Instead of mobility in X and Y directions, the motion compensating support device of the crane that is fitted to the tip end of the main boom of the crane may be configured to provide a rotation about a vertical axis as well as a linear extension and retraction in a direction radial to said vertical axis. This can be identified as a phi, R mechanism, so a rotation direction and a radial direction.

In an embodiment reference is made herein to applicants co-pending NL2017937 and PCT/NL2017/050812 which are incorporated by reference herein.

For example, as illustrated in said documents, the crane comprises:
  a base structure adapted to be mounted on the vessel;
  a revolving superstructure adapted to revolve about a substantially vertical revolving axis relative to the base structure;
  a boom structure mounted to the superstructure and pivotally connected at a first end thereof to pivot about a substantially horizontal boom pivot axis relative to the superstructure;
  a motion compensating support device mounted to a tip end portion of the boom structure;
  a hoist winch, a hoist cable and an object suspension device suspended from said hoist cable, wherein the hoist winch is mounted on the revolving superstructure or on the boom structure, and wherein the hoist cable extends from the hoist winch to said portion of the boom structure and then along the motion compensating support device to the object suspension device;
  optionally, a heave compensation device that acts on the hoist cable, wherein the heave compensation device is integrated in the hoist winch and/or arranged to act on the hoist cable intermediate the hoist winch and said portion of the boom structure; and
  a control unit,
wherein the motion compensating support device comprises:
  a pedestal member that is movably, e.g. pivotally, connected to said portion of the boom structure, e.g. to pivot about a substantially horizontal pedestal member pivot axis which is parallel to the substantially horizontal boom pivot axis;

a level setting device that is arranged between the boom structure and the pedestal member and that is adapted to set the pedestal member in a levelled position;

a jib beam mounted to the pedestal member, wherein the jib beam is slewable relative to the pedestal member about a substantially vertical slew axis, wherein the jib beam (55) extends in a substantially horizontal direction away from the substantially vertical slew axis, wherein the hoist cable extends between a hoisting location on the jib beam and the object suspension device at a distance from the substantially vertical slew axis, and wherein said distance is adjustable, wherein the jib beam carries a sheave arrangement with a front sheave at a front portion of the jib beam from which the hoist cable extends to a sheave of the object suspension device, with a rear sheave remote from said front sheave, and with a first guide sheave arranged such that said hoist cable extends from a sheave of the object suspension device via the first guide sheave to the jib beam support member and is connected thereto with a terminal end, wherein the jib beam support member carries a second guide sheave from which said hoist cable extends to the rear sheave on the jib beam, wherein, preferably, the first and second guide sheaves are arranged so that the length of hoist cable between the second guide sheave on the jib beam support member and the terminal end is substantially constant independent of the linear position of the jib beam relative to the jib beam support member, wherein the control unit provides a wave-induced motion compensation mode wherein the jib beam is slewed and said distance is adjusted to maintain a predetermined X-Y location of the object suspension device, and wherein the, optionally provided, heave compensation device is operable, when present, to compensate wave-induced Z-motion of the object suspension device.

An exemplary embodiment of such a crane is illustrated in mentioned NL2017937 and PCT/NL2017/050812.

For example, as illustrated in said documents, the crane comprises:

a base structure adapted to be mounted to a vessel;
a superstructure arranged to revolve about a substantially vertical revolving axis relative to the base structure;
a boom structure pivotally mounted to the superstructure a first end thereof to pivot about a substantially horizontal boom pivot axis relative to the superstructure;
a motion compensating support device mounted to a tip end portion of the boom structure opposite the first end;
a hoist winch, a hoist cable and an object suspension device suspended from said hoist cable, wherein the hoist cable extends at least along the motion compensating support device to the object suspension device;
a heave compensation device that acts on the hoist cable; and
a control unit, wherein the motion compensating support device comprises:

a pedestal member mounted to the tip end portion of the boom structure;
a jib beam mounted to the pedestal member, wherein the jib beam is slewable relative to the pedestal member about a substantially vertical slew axis, wherein the jib beam extends in a substantially horizontal direction away from the substantially vertical slew axis, wherein the hoist cable extends between a hoisting location on the jib beam and the object suspension device at a distance from the substantially vertical slew axis, and wherein said distance is adjustable, wherein the control unit provides a wave-induced motion compensation mode wherein the jib beam is slewed and said distance is adjusted to maintain a predetermined X-Y location of the object suspension device, and wherein the heave compensation device is operable to compensate wave-induced Z-motion of the object suspension device.

An exemplary embodiment of such a crane is illustrated in mentioned NL2017937 and PCT/NL2017/050812.

For example one or more solid ballast members, e.g. blocks or plates of steel or other rigid material, e.g. of concrete, are mounted on a carrier or carriers that is/are movable along a rectilinear rail, e.g. mounted on a beam of the rigid jib frame, e.g. a beam extending in X-direction or Y-direction. For example the one or more solid ballast members are moved by means of a winch and cable arrangement to reciprocate periodically in a manner that provides active motion compensation.

In an embodiment it is envisaged that the active motion damping mechanism is operated in the relatively short time periods of pick-up and landing a load, e.g. of a component that is removed from the nacelle or placed in the nacelle.

The motion damping ballast may be a solid motion damping ballast, e.g. one or more ballast members of steel, e.g. steel plates, concrete, or the like. In another example, the ballast may comprise one or more mobile tanks to be filled with a liquid, e.g. water or a slurry.

For example the active motion damping mechanism is releasably mounted, e.g. the solid motion damping ballast being removable, for example so that the effective hoist capacity can be enlarged by removal of the active motion damping mechanism when a heavy load needs to be handled.

The motion damping ballast may be movable in a rectilinear path, e.g. travelling over one or more ballast guide rails as is preferred. The motion damping ballast can in an alternative be made to swivel about a swivel axis, e.g. with a solid damping ballast having a center of gravity eccentric of said swivel axis.

The present invention also relates to a method for hoisting a load wherein use is made of the crane and/or the vessel provided with the crane, and wherein the active motion damping mechanism is operated.

The active motion damping mechanism may compensate for sea state induced motions in case of the crane of the vessel being operated with the vessel in floating condition, so subjected to sea motion. The active motion damping mechanism may also be advantageous in embodiments wherein the crane of the vessel is operated with the vessel in non-floating condition, e.g. a jacked up jack-up vessel equipped with the crane.

The provision of the active motion damping mechanism and operation thereof is considered advantageous in the handling of one or more offshore wind turbine components, e.g. the nacelle and/or one or more components that are housed in a nacelle and/or mounted on the nacelle, e.g. gearbox, generator, hub and/or blades, of an offshore wind turbine, e.g. for installation and/or maintenance of an offshore wind turbine. As explained this requires an enormous height of the crane, and thus a long main boom, that will exhibit motions at the tip end even when mounted on a vessel like a jack-up vessel, e.g. due to wind forces acting on the crane, vibrations in the main boom, etc.

The second aspect of the invention also relates to a vessel provided with such a crane and to a method of handling a load, e.g. as described herein, using the crane and/or the vessel.

A third aspect of the present invention relates to a motion compensating crane adapted to be mounted or mounted on an offshore vessel having a hull with a design waterline and the crane being configured for handling of one or more offshore wind turbine components, e.g. the nacelle and/or one or more components that are housed in a nacelle and/or mounted on the nacelle, e.g. gearbox, generator, hub and/or blades, of an offshore wind turbine, e.g. for installation and/or maintenance of an offshore wind turbine, wherein the crane comprises:
  a main boom pivotally connected at an inner end thereof about a substantially horizontal boom pivot axis, said main boom having a tip end remote from said inner end;
  a main boom luffing assembly adapted to set an angle of the main boom within a main boom working angle range,
wherein the main boom has a length and a main boom working angle range such that the tip end thereof is positionable in a position wherein the tip end is at least 100 meters above the design waterline of the hull of the vessel,
  a mobile hoist cable suspension member,
  a hoist winch and a hoist cable driven by said hoist winch, which hoist cable depends from said mobile hoist cable suspension member, wherein an object suspension device is suspended from said hoist cable,
wherein the mobile hoist cable suspension member is supported by a motion compensating support device that is fitted to the tip end of the main boom, which motion compensating support device comprises one or more motor powered motion displacement actuator assemblies and a motion compensating support device controller, which motion compensating support device is configured to provide motion compensation in at least one direction, e.g. in at least two directions, e.g. in orthogonal X-Y directions,
characterized in that the crane is provided with one or more nacelle position detectors that are configured to sense the actual position and/or motion of the nacelle and/or of one or more components in or on the nacelle, and wherein said one or more nacelle position detectors are linked to said motion compensating support device controller.

In an embodiment the one or more nacelle position detectors are mounted in proximity of the tip end of the main boom and/or on the motion compensating support device.

In an embodiment the one or more nacelle position detectors comprises on or more of:
  a radar detector,
  a laser range finding detector, e.g. implementing LiDAR technology,
  a camera. On the basis of suitable image processing software run on a computer the camera image can be processed and the nacelle position and/or motion detected thereby.

The present invention also relates to a method for hoisting a load wherein use is made of the crane and/or the vessel provided with the crane, and wherein the one or more nacelle position detectors are operated.

The provision of one or more nacelle position detectors is advantageous in case of the crane of the vessel being operated with the vessel in floating condition, so subjected to sea motion. The provision of one or more nacelle position detectors may also be advantageous in embodiments wherein the crane of the vessel is operated with the vessel in non-floating condition, e.g. a jacked up jack-up vessel equipped with the crane.

The third aspect of the invention also relates to a vessel provided with such a crane and to a method of handling a load, e.g. as described herein, using the crane and/or the vessel. A fourth aspect of the present invention relates to a motion compensating crane for use on an offshore vessel having a hull with a design waterline, e.g. for use in handling of one or more offshore wind turbine components, e.g. the nacelle and/or one or more components that are housed in a nacelle and/or mounted on the nacelle, e.g. gearbox, generator, hub and/or blades, of an offshore wind turbine, e.g. for installation and/or maintenance of an offshore wind turbine, wherein the crane comprises:
  a main boom pivotally connected at an inner end thereof about a substantially horizontal boom pivot axis, said main boom having a tip end remote from said inner end;
  a main boom luffing assembly adapted to set an angle of the main boom within a main boom working angle range,
wherein the main boom, preferably, has a length and a main boom working angle range such that the tip end thereof is positionable in a position wherein the tip end is at least 100 meters above the design waterline of the hull of the vessel,
  a mobile hoist cable suspension member,
  a hoist winch and a hoist cable driven by said hoist winch, which hoist cable depends from said mobile hoist cable suspension member, wherein an object suspension device is suspended from said hoist cable,
wherein the mobile hoist cable suspension member is supported by a motion compensating support device that is fitted to the tip end of the main boom, which motion compensating support device comprises one or more motor powered motion displacement actuator assemblies and a motion compensating support device controller, which motion compensating support device is configured to provide motion compensation in at least one direction, e.g. in at least two directions, e.g. in orthogonal X-Y directions,
characterized in that the crane is provided with a first hoist winch that is connected to a first end of said hoist cable, e.g. said first jib hoist winch having a drum onto which said first end is wound, and wherein a second hoist winch is connected to a second end of said hoist cable, e.g. a second hoist winch having a drum onto which said second end is wound. This arrangement provides for redundancy and allows for a large range of effective speeds of lowering and hoisting the load, e.g. favourable in view of rapid pick-up and landing of a component that belongs in the nacelle or of a wind turbine blade.

In an embodiment the first and second hoist winch are configured for independent control of each of the first and second hoist winches.

In an embodiment the mobile hoist cable suspension member comprises a first, second, third and fourth top sheave each having a horizontal sheave axis, wherein said object suspension member comprises a first and a second bottom sheave, wherein said hoist cable extends in a double fall arrangement between said first and second top sheaves and said first bottom sheave, and in a double fall arrangement between third and fourth top sheaves and said second bottom sheave, and therefore in a four fall arrangement between said mobile hoist cable suspension member and said object connection member.

The fourth aspect of the invention also relates to a vessel provided with such a crane and to a method of handling a load, e.g. as described herein, using the crane and/or the vessel.

The present invention also relates to a method for hoisting a load wherein use is made of the crane and/or the vessel provided with the crane.

The fourth aspect of the invention is advantageous in case of the crane of the vessel being operated with the vessel in floating condition, so subjected to sea motion, but may also be advantageous in embodiments wherein the crane of the vessel is operated with the vessel in non-floating condition, e.g. a jacked up jack-up vessel equipped with the crane.

A fifth aspect of the invention relates to a motion compensating crane for use on an offshore vessel having a hull with a design waterline, e.g. for use in handling of one or more offshore wind turbine components, e.g. the nacelle and/or one or more components that are housed in a nacelle and/or mounted on the nacelle, e.g. gearbox, generator, hub and/or blades, of an offshore wind turbine, e.g. for installation and/or maintenance of an offshore wind turbine, wherein the crane comprises:
- a main boom pivotally connected at an inner end thereof about a substantially horizontal boom pivot axis, said main boom having a tip end remote from said inner end;
- a main boom luffing assembly adapted to set an angle of the main boom within a main boom working angle range, wherein the main boom has a length and a main boom working angle range such that the tip end thereof is positionable in a position wherein the tip end is at least 100 meters above the design waterline of the hull of the vessel,
- a mobile hoist cable suspension member,
- a hoist winch and a hoist cable driven by said hoist winch, which hoist cable depends from said mobile hoist cable suspension member, wherein an object suspension device is suspended from said hoist cable, wherein the mobile hoist cable suspension member is supported by a motion compensating support device that is fitted to the tip end of the main boom, which motion compensating support device comprises motor powered motion displacement actuator assemblies and a motion compensating support device controller, which motion compensating support device is configured to provide motion compensation is at least two directions, e.g. in orthogonal X-Y directions, characterized in that one or more of the motor powered motion displacement actuator assemblies are provided with a clutch device that is configured to provide a free-floating mode of the motion compensating support device in the event of an electrical black-out.

The fifth aspect of the invention also relates to a vessel provided with such a crane and a method of operation of the crane, wherein the clutch device provides, preferably automatically, a free-floating mode of the motion compensating support device in the event of an electrical black-out.

The fifth aspect also relates to a motion compensating crane for use on an offshore vessel having a hull with a design waterline, e.g. for use in handling of one or more offshore wind turbine components, e.g. the nacelle and/or one or more components that are housed in a nacelle and/or mounted on the nacelle, e.g. gearbox, generator, hub and/or blades, of an offshore wind turbine, e.g. for installation and/or maintenance of an offshore wind turbine, wherein the crane comprises:
- a main boom pivotally connected at an inner end thereof about a substantially horizontal boom pivot axis, said main boom having a tip end remote from said inner end;
- a main boom luffing assembly adapted to set an angle of the main boom within a main boom working angle range, wherein the main boom has a length and a main boom working angle range such that the tip end thereof is positionable in a position wherein the tip end is at least 100 meters above the design waterline of the hull of the vessel,
- a mobile hoist cable suspension member,
- a hoist winch and a hoist cable driven by said hoist winch, which hoist cable depends from said mobile hoist cable suspension member, wherein an object suspension device is suspended from said hoist cable, wherein the mobile hoist cable suspension member is supported by a motion compensating support device that is fitted to the tip end of the main boom, which motion compensating support device comprises electric motor powered motion displacement actuator assemblies and a motion compensating support device controller, which motion compensating support device is configured to provide motion compensation is at least two directions, e.g. in orthogonal X-Y directions, characterized in that the crane is provided with one or more back-up energy storage devices configured to provide electrical power to at least said electric motor powered motion displacement actuator assemblies in the event of a black-out on board the vessel, for example said one or more back-up energy storage devices comprising:
- a back-up electrical battery,
- a supercapacitor device,
- a flywheel coupled to an electrical generator,
- a back-up fuel powered generator.

The fifth aspect of the invention also relates to a motion compensating crane for use on an offshore vessel having a hull with a design waterline, e.g. for use in handling of one or more offshore wind turbine components, e.g. the nacelle and/or one or more components that are housed in a nacelle and/or mounted on the nacelle, e.g. gearbox, generator, hub and/or blades, of an offshore wind turbine, e.g. for installation and/or maintenance of an offshore wind turbine, wherein the crane comprises:
- a main boom pivotally connected at an inner end thereof about a substantially horizontal boom pivot axis, said main boom having a tip end remote from said inner end;
- a main boom luffing assembly adapted to set an angle of the main boom within a main boom working angle range, wherein the main boom has a length and a main boom working angle range such that the tip end thereof is positionable in a position wherein the tip end is at least 100 meters above the design waterline of the hull of the vessel,
- a mobile hoist cable suspension member,
- a hoist winch and a hoist cable driven by said hoist winch, which hoist cable depends from said mobile hoist cable suspension member, wherein an object suspension device is suspended from said hoist cable, wherein the mobile hoist cable suspension member is supported by a motion compensating support device that is fitted to the tip end of the main boom, which motion compensating support device comprises hydraulic motor powered motion displacement actuator assemblies and a motion compensating support device controller, which motion compensating support device is configured to provide motion compensation is at least two directions, e.g. in orthogonal X-Y directions, characterized in that the crane is provided with one or more back-up energy storage devices configured to provide hydraulic power to at least said hydraulic motor powered motion displacement actuator assemblies in the event of a black-out on board the vessel, said one or more back-up energy storage devices comprising for example:
- a hydraulic accumulator,
- a bank of compressed gas, e.g. nitrogen gas, storage vessels connected to a gas pressurized hydraulic cylinder of which a hydraulic chamber is connected to said hydraulic motor powered motion displacement actuator assemblies.

The fifth aspect of the invention also relates to a vessel provided with such a crane.

The present invention also relates to a method for hoisting a load wherein use is made of the crane and/or the vessel provided with the crane.

A sixth aspect of the invention relates to a motion compensating crane for use on an offshore vessel having a hull with a design waterline, e.g. for use in handling of one or more offshore wind turbine components, e.g. the nacelle and/or one or more components that are housed in a nacelle and/or mounted on the nacelle, e.g. gearbox, generator, hub and/or blades, of an offshore wind turbine, e.g. for installation and/or maintenance of an offshore wind turbine, wherein the crane comprises:
- a main boom pivotally connected at an inner end thereof about a substantially horizontal boom pivot axis, said main boom having a tip end remote from said inner end;
- a main boom luffing assembly adapted to set an angle of the main boom within a main boom working angle range, wherein the main boom has a length and a main boom working angle range such that the tip end thereof is positionable in a position wherein the tip end is at least 100 meters above the design waterline of the hull of the vessel,
- a mobile hoist cable suspension member,
- a hoist winch and a hoist cable driven by said hoist winch, which hoist cable depends from said mobile hoist cable suspension member, wherein an object suspension device is suspended from said hoist cable, wherein the mobile hoist cable suspension member is supported by a motion compensating support device that is fitted to the tip end of the main boom, which motion compensating support device comprises one or more motor powered motion displacement actuator assemblies and a motion compensating support device controller, which motion compensating support device is configured to provide motion compensation in at least one direction, e.g. in at least two directions, e.g. in orthogonal X-Y directions,
characterized in that the crane is provided with an inertial measurement device that is mounted in proximity of the tip of the main boom, and/or mounted on the hull of the vessel or on a part rigidly connected thereto, e.g. on a base structure of the crane, and wherein said one or more inertial measurement device provide one or more reference signals on the basis of which control signals for said motor powered motion displacement actuator assemblies are computed and provided to the motion compensating support device controller.

The sixth aspect of the invention also relates to a vessel provided with such a crane.

The present invention also relates to a method for hoisting a load wherein use is made of the crane and/or the vessel provided with the crane.

The sixth aspect of the invention also relates to a method for handling by means of a crane of one or more offshore wind turbine components, e.g. the nacelle and/or one or more components that are housed in a nacelle and/or mounted on the nacelle, e.g. gearbox, generator, hub and/or blades, of an offshore wind turbine, e.g. for installation and/or maintenance of an offshore wind turbine, wherein the crane comprises:
- a mobile hoist cable suspension member,
- a hoist winch and a hoist cable driven by said hoist winch, which hoist cable depends from said mobile hoist cable suspension member, wherein an object suspension device is suspended from said hoist cable, wherein the mobile hoist cable suspension member is supported by a motion compensating support device, which motion compensating support device comprises one or more motor powered motion displacement actuator assemblies and a motion compensating support device controller, which motion compensating support device is configured to provide motion compensation in one or more, e.g. in at least two directions, e.g. in orthogonal X-Y directions,
characterized in that a first inertial measurement device is mounted on or in proximity of the nacelle and configured to provide one or more first reference signals representative of actual motion of the wind turbine nacelle or in proximity thereof, and a second inertial measurement device is mounted on the crane, e.g. in proximity of a tip end of a main boom of the crane, said second inertial measurement device being configured to provide one or more second reference signals representative of actual motion of the crane,
wherein the motion compensating support device controller is linked to both said first and second inertial measurement devices and configured to compute and provide control signals for said one or more motor powered motion displacement actuator assemblies and the basis of said first and second reference signals.

This arrangement allows to effectively compensate for motions of the nacelle and/or the top end of the mast of the wind turbine itself, e.g. induced by wind and/or waves.

In an embodiment the first reference signals are wireless transmitted to the motion compensating support device controller.

A seventh aspect of the invention relates to a motion compensating crane for use on an offshore vessel having a hull with a design waterline, e.g. for use in handling of one or more offshore wind turbine components, e.g. the nacelle and/or one or more components that are housed in a nacelle and/or mounted on the nacelle, e.g. gearbox, generator, hub and/or blades, of an offshore wind turbine, e.g. for installation and/or maintenance of an offshore wind turbine, wherein the crane comprises:
- a main boom pivotally connected at an inner end thereof about a substantially horizontal boom pivot axis, said main boom having a tip end remote from said inner end;
- a main boom luffing assembly adapted to set an angle of the main boom within a main boom working angle range, wherein the main boom has a length and a main boom working angle range such that the tip end thereof is positionable in a position wherein the tip end is at least 100 meters above the design waterline of the hull of the vessel,
- a mobile hoist cable suspension member,
- a hoist winch and a hoist cable driven by said hoist winch, which hoist cable depends from said mobile hoist cable suspension member, wherein an object suspension device is suspended from said hoist cable, wherein the mobile hoist cable suspension member is supported by a motion compensating support device that is fitted to the tip end of the main boom, which motion compensating support device comprises motor powered motion displacement actuator assemblies and a motion compensating support device controller, which motion compensating support device is configured to provide motion compensation is at least two directions, e.g. in orthogonal X-Y directions,
characterized in that the hoist winch is an active heave compensating winch (AHC winch) and the crane and/or the vessel onto which the crane is mounted or is to be mounted is provided with one or more sensors, e.g. a radar, a laser range finding device, a camera vision system, an inertial measurement device, and wherein said one or more sensors provide one or more reference signals on the basis of which control signals for said active heave compensating winch are provided.

The seventh aspect of the invention also relates to a vessel provided with such a crane and to a method of handling a load, e.g. as described herein, using the crane and/or the vessel. An eight aspect of the invention relates to a motion compensating crane for use on an offshore vessel having a hull with a design waterline, e.g. for use in handling of one or more offshore wind turbine components, e.g. the nacelle and/or one or more components that are housed in a nacelle and/or mounted on the nacelle, e.g. gearbox, generator, hub and/or blades, of an offshore wind turbine, e.g. for installation and/or maintenance of an offshore wind turbine, wherein the crane comprises:

a main boom pivotally connected at an inner end thereof about a substantially horizontal boom pivot axis, said main boom having a tip end remote from said inner end;

a main boom luffing assembly adapted to set an angle of the main boom within a main boom working angle range, wherein the main boom has a length and a main boom working angle range such that the tip end thereof is positionable in a position wherein the tip end is at least 100 meters above the design waterline of the hull of the vessel, a mobile hoist cable suspension member, a hoist winch and a hoist cable driven by said hoist winch, which hoist cable depends from said mobile hoist cable suspension member, wherein an object suspension device is suspended from said hoist cable, wherein the mobile hoist cable suspension member is supported by a motion compensating support device that is fitted to the tip end of the main boom, which motion compensating support device comprises at least one motor powered motion displacement actuator assemblies and a motion compensating support device controller, which motion compensating support device is configured to provide motion compensation in at least one direction, e.g. in at least two directions, e.g. in orthogonal X-Y directions,
characterized in that the main boom is provided with one or more force sensors that are configured to provide reference signals representative of actual load on the main boom, and wherein the motion compensating support device controller is linked to said one or more force sensors and configured to compute and provide control signals for said one or more motor powered motion displacement actuator assemblies on the basis of said reference signals of said one or more force sensors.

For example use is made of an optical fiber Bragg grating force sensor.

It is envisaged in this aspect that force sensors may represent actual deflection and/or dynamic motion within the main boom, which is then taken into account by the motion compensating support device controller when it comes to controlling the one or more motor powered motion displacement actuator assemblies.

The eight aspect of the invention also relates to a vessel provided with such a crane.

The present invention also relates to a method for hoisting a load wherein use is made of the crane and/or the vessel provided with the crane.

It will be appreciated that any of the measures according to any of the aspects described herein, including those described herein as optional or preferable or the like in the context of one aspect, can be readily combined with any of the other aspects described herein.

The present invention also relates to an offshore vessel provided with a crane as described herein according to any aspect or combinations of aspects of the invention.

In an embodiment the vessel has a semi-submersible type hull with two parallel submerged or submergible pontoons, support columns extending upward from said pontoons, and a deck box structure supported on said columns.

It will be appreciated that aspects of the invention described herein are applicable to vessels operated in floating condition when handling a load by means of the crane and to vessels that are configured for crane operation in non-floating condition, e.g. a jacked-up jack-up crane vessel. As explained, even when a crane is mounted on a jack-up vessel and operated with the vessel jacked up, and thereby not affected by sea state as a floating vessel, the tall crane required for handling for example components to be placed in a nacelle will be subject to motion. Equally, even with the crane relatively still, the tall wind turbine may exhibit motion due to wind and/or sea state.

The crane may be an around-the-leg crane wherein the bearing supporting the superstructure is mounted to extend around a jack-up leg of a jack-up vessel.

The present invention also relates to a method for handling a component wherein use is made of the cranes described herein, for example of components "at the height of the nacelle", which includes for example the handling of the nacelle itself, and/or one or more components that are housed in a nacelle and/or mounted on the nacelle, e.g. gearbox, generator, hub and/or blades, of an offshore wind turbine.

The various aspects of the invention will now be discussed with reference to the drawings.

DETAILED DESCRIPTION OF EMBODIMENTS

Figure 1:
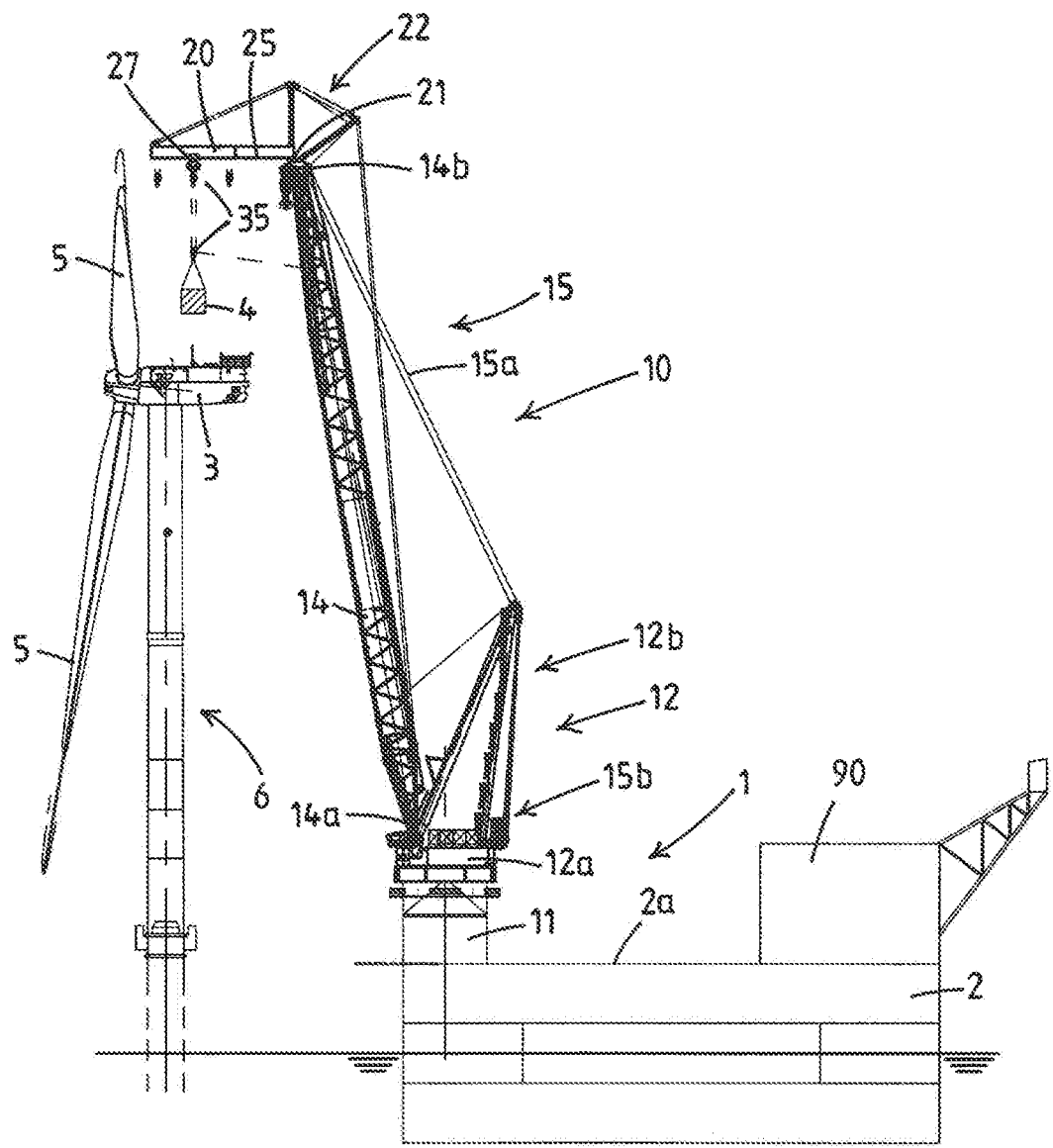
FIG. 1 shows schematically an example of an offshore crane vessel provided with a crane according to the invention during the handling of a component to be installed in or removed from a nacelle of an offshore wind turbine.
Figure 2:
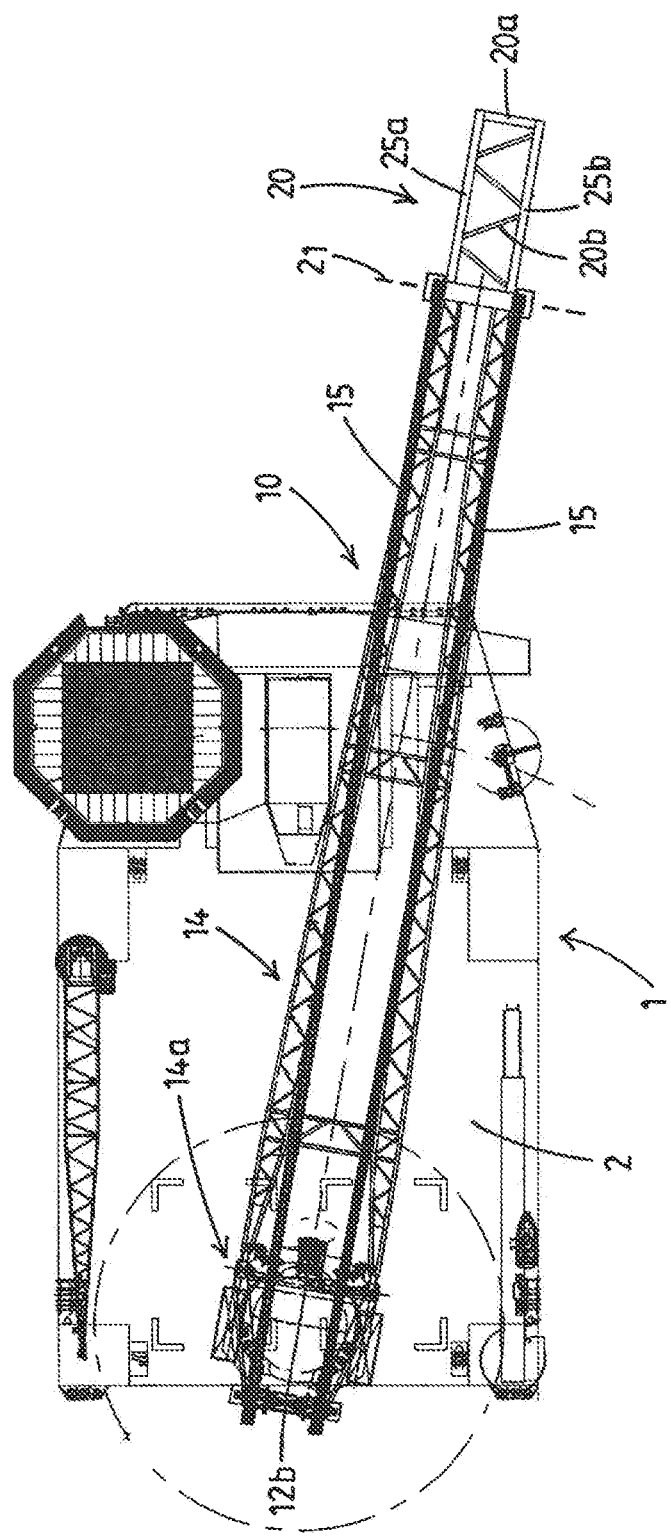
FIG. 2 shows a plan view of the vessel of FIG. 1 during transit.
Figure 3:
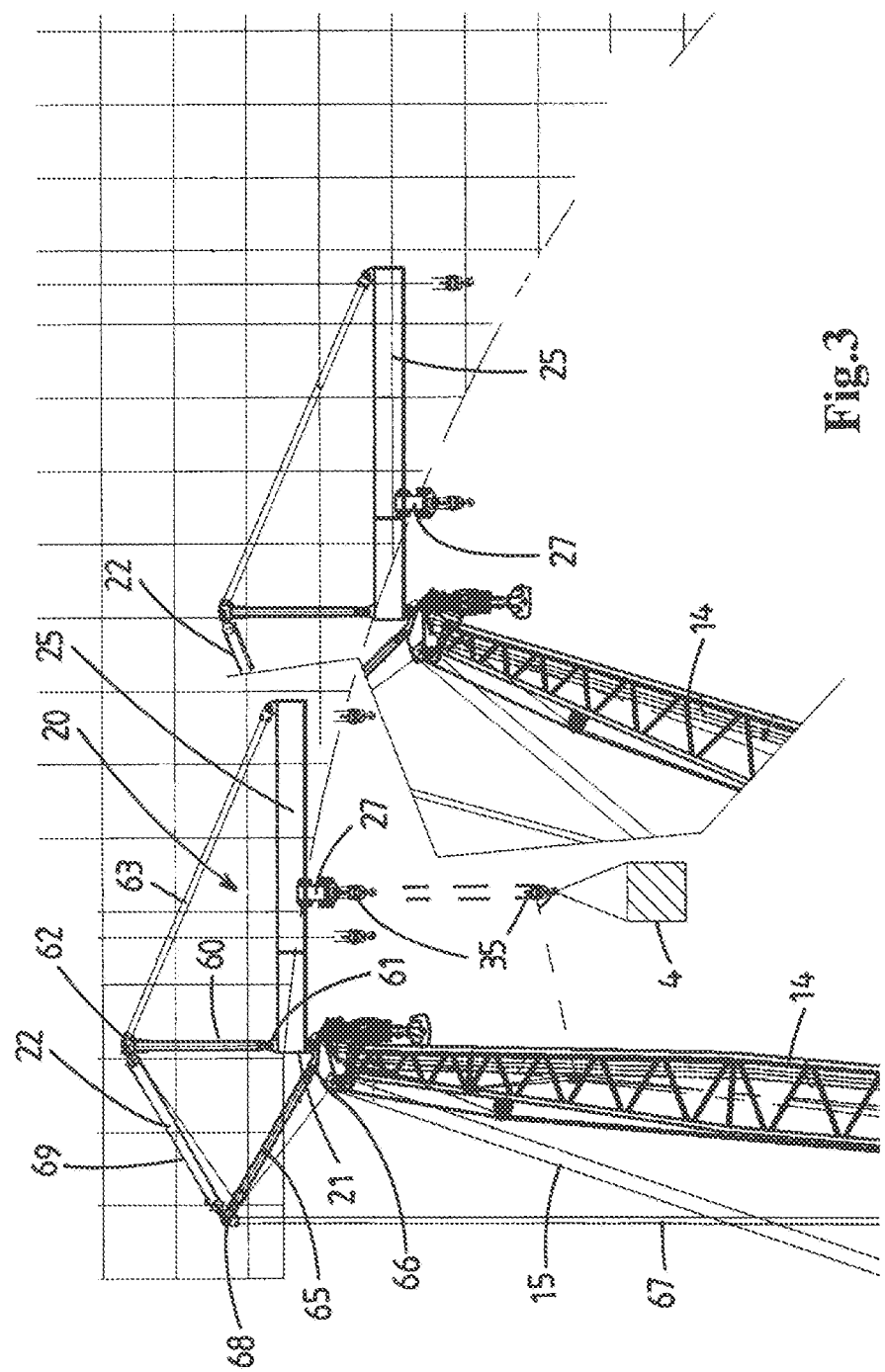
FIG. 3 shows a close-up of the tip end of the boom in various positions.

FIGS. 1 and 2 illustrate an offshore vessel 1 having a motion compensating crane 10 for use on an offshore vessel. The vessel has a hull 2 with a design waterline. The vessel is for example configured for use in handling of one or more offshore wind turbine components, e.g. the nacelle 3 and/or one or more components that are housed in a nacelle and/or mounted on the nacelle, e.g. gearbox, generator 4, hub and/or blades 5, of an offshore wind turbine 6. These activities may relate to installation and/or maintenance of an offshore wind turbine 6.

As will be appreciated by the skilled person, the illustrated vessel 1 is a semi-submersible vessel having two parallel submergible pontoons, columns extending upwards from each of these pontoons, and a deck box structure supported by the columns, the deck box structure having a deck, the base structure being fixed to said deck.

As will be appreciated by the skilled person, the illustrated vessel 1 has a crew and bridge superstructure 90 at the bow of the vessel. The vessel has a deck 2a aft of the crew and bridge superstructure 90.

The crane 10 here is mounted at the stern of the vessel 1.

As illustrated the crew and bridge superstructure is arranged asymmetrically at the bow of the vessel, e.g. toward the port side thereof, and the crane 10 is arranged asymmetrically at the stern of the vessel, opposite from the centreline of the vessel relative to the crew and bridge superstructure, e.g. toward the starboard side thereof.

The crane 10 comprises:
- a base structure 11 adapted to be secured to the hull 2 of the vessel, here fixed to the deck of the vessel;
- a revolving superstructure 12 mounted on the base structure 11 and adapted to revolve about a substantially vertical revolving axis relative to the base structure;
- a slew drive adapted to revolve said superstructure, for example a rack and pinion drive;
- a main boom 14 mounted to the revolving superstructure 12 and pivotally connected at an inner end thereof about a substantially horizontal boom pivot axis 14a to the revolving superstructure 12, the main boom having a tip end 14b remote from this inner end;
- a main boom luffing assembly 15 adapted to set an angle of the main boom relative to the superstructure within a main boom working angle range.

The superstructure comprises a crane housing 12a and a gantry structure 12b erected on and supported by the crane housing 12a. The crane housing 12a is mounted via a slew bearing on the base structure 11.

The main boom luffing assembly 15 of the crane comprises a main boom luffing cable 15a and winch system 15b. The luffing cable extends between the gantry structure 12b and the main boom 14 and allows to pivot the boom 14 up and down by means of a luffing winch 15b and to set the main boom in one or more desired angles within the working range thereof. The crane housing 12a comprises one or more main boom supports at a front side of the crane housing.

The gantry structure 12b comprises a substantially vertical rear gantry frame member connected at a lower end thereof to the rear side of the crane housing, and the gantry structure comprises front gantry frame member attached at an upper end thereof to the rear gantry frame member and extending inclined forward to an attachment on the crane housing in proximity of the one or more main boom supports.

In an embodiment the crane housing comprises a left-hand main boom support and a right-hand main boom support spaced from one another in said Y-direction. For example the main boom is a twin leg main boom, each leg pivotally secured to a respective main boom support.

In particular in view of deployment of the vessel 1 in an offshore wind farm the main boom 14, e.g. a lattice boom 14, has a length and a main boom working angle range such that the tip end thereof is positionable in a position wherein the tip end is at least 100 meters above the design waterline of the hull of the vessel.

The crane further comprises:
- a rigid jib frame 20 that is pivotally connected to the tip end of the main boom 14 about a substantially horizontal jib frame pivot axis 21,
- a level setting assembly 22 that is adapted to set the rigid jib frame 20 in a levelled position whilst the main boom 14 has any angle within said main boom working angle range.

As illustrated the rigid jib frame 20 is provided with a set of parallel X-direction tracks 25 that extend perpendicular to the horizontal jib frame pivot axis 21 and which are substantially horizontal in a levelled position of the rigid jib frame 20.

As illustrated the rigid jib frame 20 has a first X-direction frame beam provided with said first X-direction track 25a and a parallel second X-direction frame beam provided with said second X-direction track 25b. For example the first and second X-direction frame beams are each embodied as a hollow box beam externally provided with said respective X-direction track.

As illustrated in FIG. 2 the rigid jib frame 20 is provided with an outer transverse frame beam 20a extending in Y-direction and interconnecting respective outer ends of the first and second X-direction frame beams. An inner transverse frame beam extending in Y-direction and interconnecting respective inner ends of the first and second X-direction frame beams may also be provided.

FIG. 2 also illustrates that the rigid jib frame is provided with one or more diagonal bracing members 20b, e.g. the rigid jib frame having first and second X-direction beam members 25a, b and at least one of inner and outer transverse beam members 20a interconnecting the first and second X-direction beam members at the inner and outer ends thereof respectively, e.g. to form corners of a substantially rectangular frame portion.

In more detail the crane 10 is provided with:
- a jib frame strut structure 60 having an inner end 61 that is pivotally connected to the rigid jib frame in proximity of the pivot axis 21 thereof and having an outer end 62,
- at least one forestay member 63 extending from the outer end 62 of the jib frame strut structure 60 to an attachment point on the rigid jib frame 20 remote from the pivot axis 21 thereof,
- a main boom strut structure 65 having an inner end 66 connected to the main boom 14 in proximity of the tip end 14b thereof,
- a main boom backstay 67 extending between an outer end 68 of the main boom strut structure 65 and a lower portion of the main boom 14,
- a variable length stay mechanism 69 provided between the main boom strut structure 66 and the jib strut structure 60. This variable length stay mechanism 69 here forms the level setting assembly 22 and is adapted to set the rigid jib frame 20 in a levelled position whilst the main boom 14 has any angle within the main boom working angle range.

In an embodiment two forestay members 63 extend between the jib frame strut structure 60 and respective attachment points on the rigid jib frame 20, e.g. each secured at an end of a X-track 25a, b.

In an embodiment two backstay members extend between the main boom strut structure and the lower portion of the main boom.

The crane 10 further comprises:
- a mobile carrier 27 that is supported by the parallel X-direction tracks 25 and is movable relative thereto in an X-direction,
- a motor powered X-motion displacement actuator assembly (see FIG. 5) that is adapted to move the mobile carrier 27 in said X-direction relative to said X-direction tracks 25, The mobile carrier 27 is provided with one or multiple parallel Y-direction tracks 28 that extend perpendicular to the X-direction tracks 25.

The crane 10 further comprises:
- a mobile jib hoist cable suspension member 30 that is supported by the one or more Y-direction tracks 28 and is movable relative thereto in an Y-direction,
- a motor powered Y-motion displacement actuator assembly (see FIG. 6) that is adapted to move the mobile jib hoist cable suspension member 30 in said Y-direction relative to the one or more Y-direction tracks 28, The crane 10 further comprises a jib hoist winch 32, 33 and a jib hoist cable 34 driven by the hoist winch 32, 33, which jib hoist cable 34 depends from the mobile jib hoist cable suspension member 30. An object suspension device 35 is suspended from the jib hoist cable 34.

Figure 7:
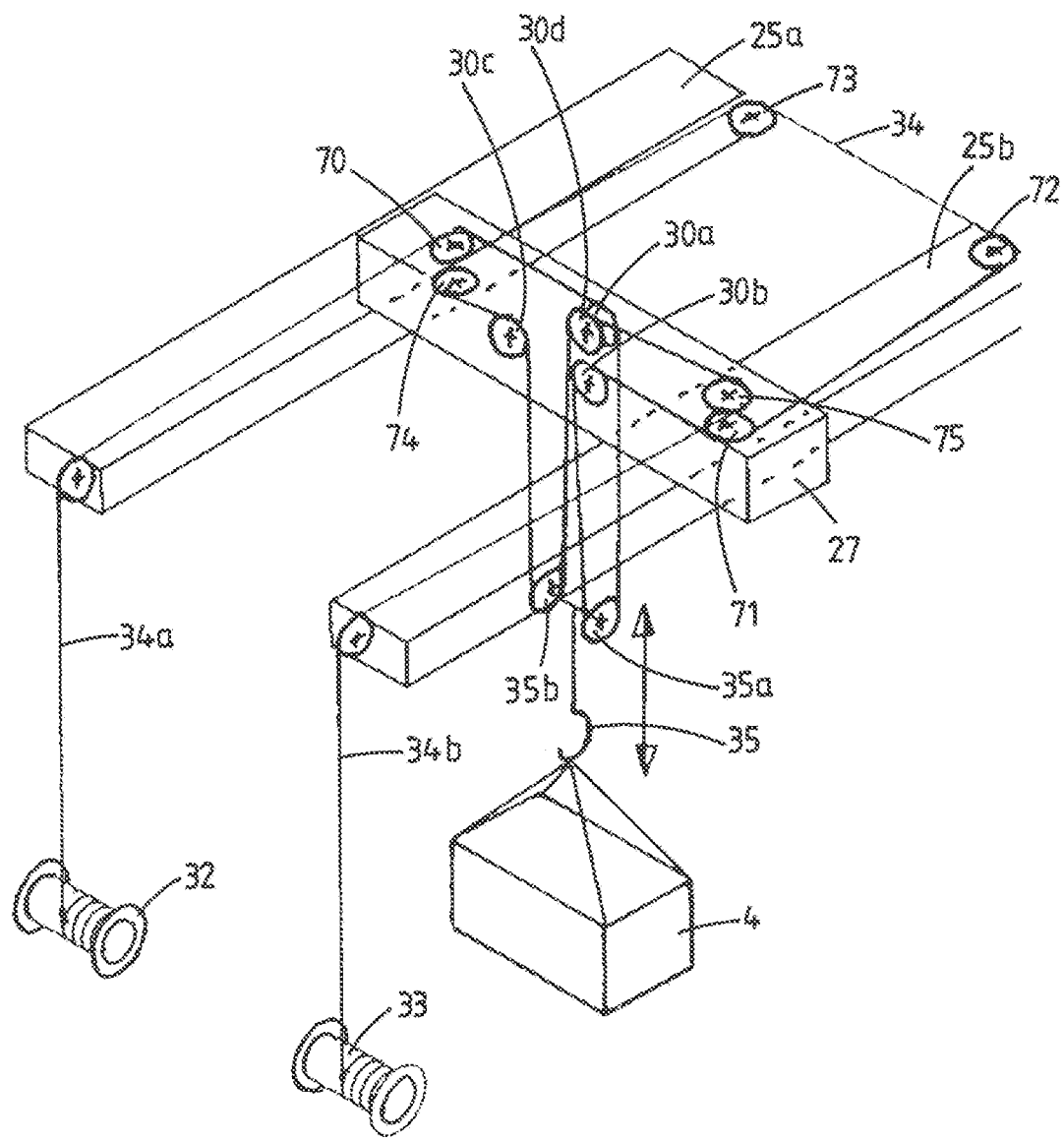
FIG. 7 shows a schematic explanation of the compensation in Z-direction of the crane of FIG. 1.

The crane 10 further comprises a Z-direction heave motion compensation device, here embodied by AHT (active heave compensating) winches 32, 33 in FIG. 7, that acts on the jib hoist cable 34 and is integrated in the jib hoist winch and/or comprises a jib hoist cable engaging member that is arranged and adapted to act on the jib hoist cable intermediate the hoist winch object suspension device suspended from the jib hoist cable.

Figure 5:
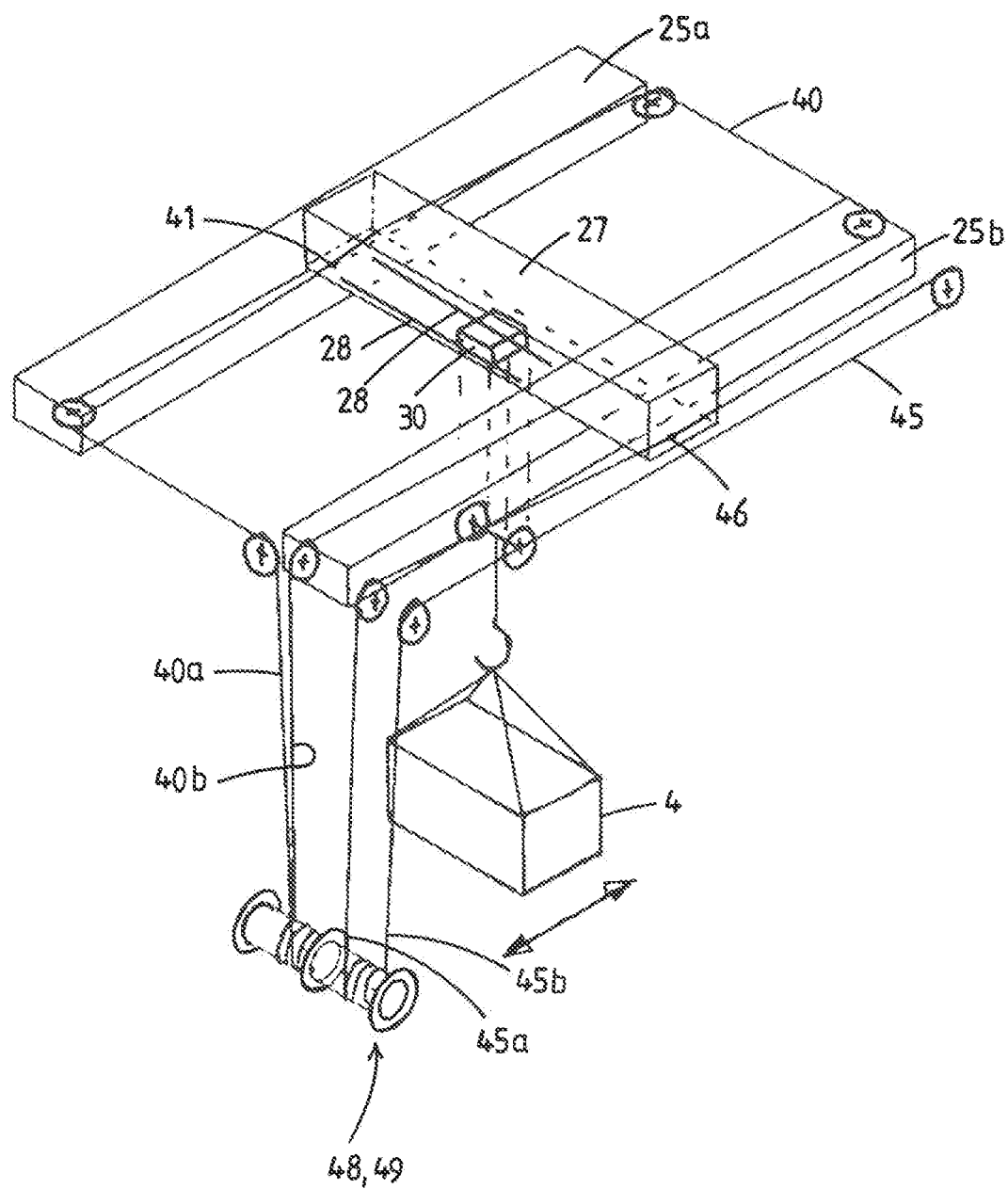
FIG. 5 shows a schematic explanation of the compensation in X-direction of the crane of FIG. 1.

FIG. 5 illustrates that the X-direction winch and cable assembly comprises a first X-direction cable 40 attached to the mobile carrier 27 at a first attachment point 41 thereof in proximity of a first X-direction track 25a of the rigid jib frame 20. A second X-direction cable 45 is attached to the mobile carrier 27 at a second attachment point 46 thereof in proximity of a second X-direction track 25b of the rigid jib frame 20.

The X-direction winch and cable assembly comprises a motor powered X-direction winch 48 having a rotatable winch drum 49 with first, second, third, and fourth drum sections. Herein a first end 40a of the first X-direction cable 40 is wound onto the first drum section. A second end 40b of the first X-direction cable 40 is wound onto the second drum section in opposite sense to the winding of the first end 40a of the first X-direction cable. A first end 45a of the second X-direction cable 45 is wound onto the third section, and a second end 45b of the second X direction cable 45 is wound onto the fourth section in opposite sense to the winding of the first end 45a of the second X-direction cable.

Figure 6:
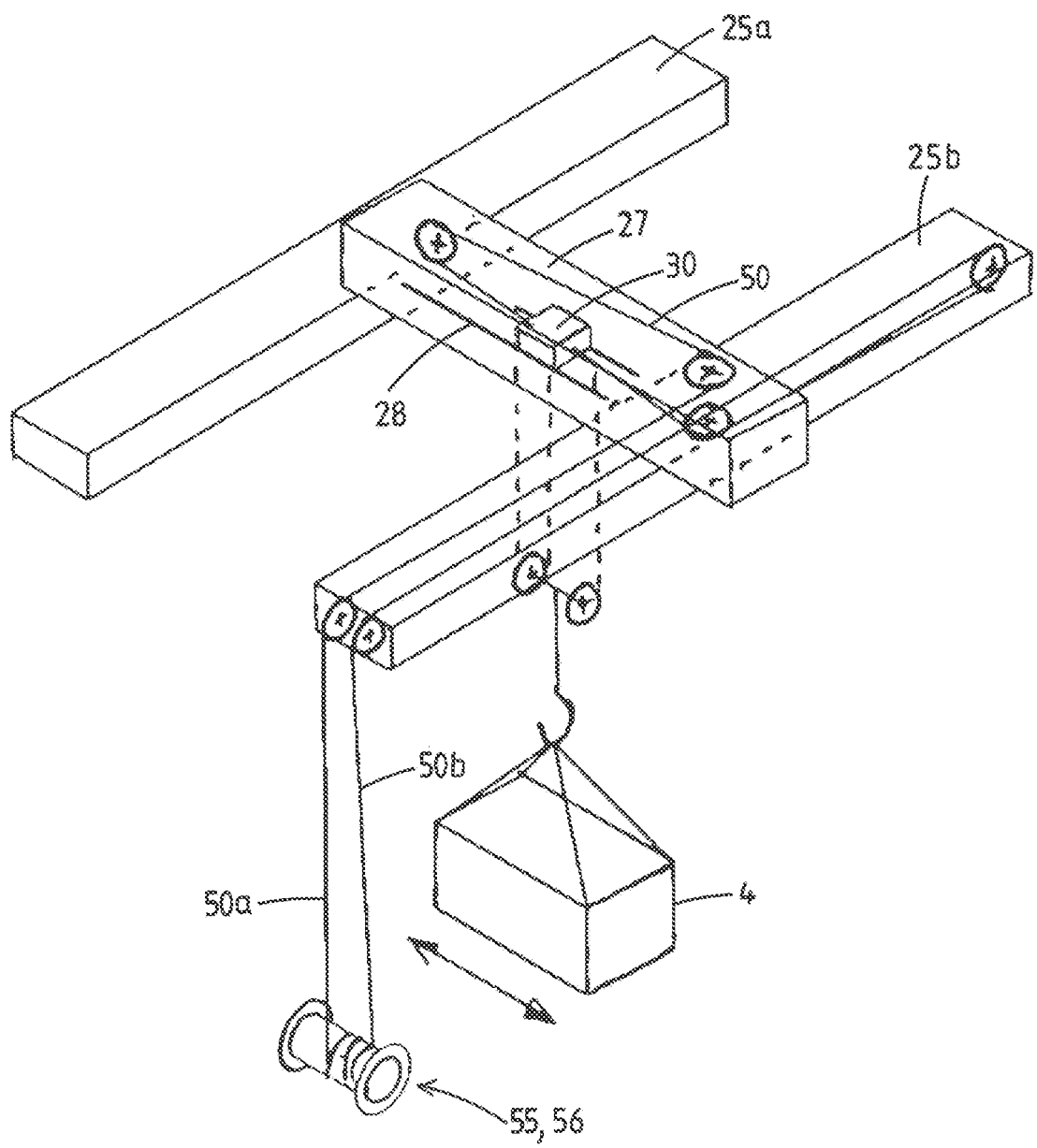
FIG. 6 shows a schematic explanation of the compensation in Y-direction of the crane of FIG. 1.

FIG. 6 illustrates that the Y-direction winch and cable assembly has a single Y-direction cable 50 that is attached to the mobile hoisting cable suspension member 30 and an associated motor power Y-direction winch 55 having a rotatable winch drum 56 with a first and section drum section. Herein a first end 50a of the single Y-direction cable is wound onto the first drum section and a second end 50b of the single Y-direction cable is wound onto the second drum section in opposite sense to the winding of the first end 50a of the Y-direction cable.

In an embodiment one or more of the motor powered motion displacement actuator assemblies, for example the winch(es) associated with the X-direction and/or with the Y-direction, here winches 48,49 and 55, 56 are provided with a clutch device that is configured to provide a free-floating mode of the motion compensating support device in the event of an electrical black-out. Unfortunately black-outs do occur on offshore vessels for various reasons. By providing one or more clutches, e.g. between a winch drive motor and the drum, that switch automatically into a free-floating mode upon occurrence of a black-out an undue force on a load 4 suspended from cable 34 is avoided. For example when the load is a gearbox still within the nacelle 3 the suspension member 30 will remain generally centered above the gearbox when free-floating mode is provided for in both X and Y direction. Of course it is envisaged that the winch(es) governing the Z-direction is not switched in free-floating mode.

In view of the occurrence of black-out the crane 10 may be provided with one or more back-up energy storage devices configured to provide electrical power to at least electric motor powered motion displacement actuator assemblies, here winches 48,59 and 55, 56, and 32, 33, in the event of a black-out on board the vessel. For example said one or more back-up energy storage devices comprise:
- a back-up electrical battery,
- a supercapacitor device,
- a flywheel coupled to an electrical generator,
- a back-up fuel powered generator.

The crane 10 may be provided with one or more back-up energy storage devices configured to provide hydraulic power to at least hydraulic motor powered motion displacement actuator assemblies in the event of a black-out on board the vessel. These one or more back-up energy storage devices comprise for example:
- a hydraulic accumulator,
- a bank of compressed gas, e.g. nitrogen gas, storage vessels connected to a gas pressurized hydraulic cylinder of which a hydraulic chamber is connected to said hydraulic motor powered motion displacement actuator assemblies.

FIG. 7 illustrates that the jib hoist cable 34 has a first end 34a and a second end 34b. The mobile jib hoist cable suspension member 30 is comprises a first and a second top sheave, here four top sheaves 30a-d, each having a horizontal sheave axis.

The object suspension member 35 comprises a first bottom sheave, here two bottom sheaves 35a,b. The jib hoist cable 34 extends in a double fall arrangement between the four top sheaves 30a-d and the two bottom sheaves 35a,b.

As illustrated the mobile jib hoist cable suspension member 30 comprises a first top sheave 30a, a second top sheave 30b, a third top sheave 30c, and a fourth top sheave 30d to arrive at a four fall arrangement of the hoist cable 34. One or more additional pairs of top sheave, and for each pair an additional bottom sheave can be provided for if an even greater number of falls is desired.

The mobile carrier 27 is provided with first and second cable guiding sheaves 70,71 at opposite locations thereon seen in Y-direction.

The jib hoist cable 34 passes from a first end 34a thereof in a positive X-direction, e.g. away from the axis 21, to the first cable guiding sheave 70 on the mobile carrier 28, and then from the first cable guiding sheave 70 on the mobile carrier to the first top sheave 30a, via the first bottom sheave 35a to the second top sheave 30b, and from the second top sheave 30b to the second cable guiding sheave 71 on the mobile carrier 27.

The rigid jib frame is provided with third and fourth cable guiding sheaves 72,73, each in proximity of an end of a respective second and first X-direction track 25b,25a of the rigid jib frame.

The jib hoist cable 34 extends from the second cable guiding sheave 71 on the mobile carrier in said positive X-direction to said third cable guiding sheave 72 on the rigid jib frame, and from the third cable guiding sheave 72 to the fourth cable guiding sheave 73.

The mobile carrier 27 is further provided with fifth and sixth cable guiding sheaves 74,75. The fifth cable guiding sheave 74 is arranged in proximity of the first cable guiding sheave 70 and the sixth cable guiding sheave 75 in proximity of the second cable guiding sheave 71.

The jib hoist cable 34 extends from the fourth cable guiding sheave 73 on the rigid jib frame in a negative X-direction to the fifth cable guiding sheave 74 on the mobile carrier 27 and passes from the fifth cable guiding sheave 74 to the third top sheave 30c, down to the second bottom sheave 35b and up to the fourth top sheave 30d, and from said fourth top sheave 30d to the sixth cable guiding sheave 75, The jib hoist cable extends from the sixth cable guiding sheave in a negative X-direction to said second end 34b of the hoisting cable.

At least one of said first and second ends of the jib hoist cable is connected to a hoisting winch 32, 33. If just one winch is provided for one end, the other end may be embodied to an anchoring point.

In an embodiment a first jib hoist winch 32 is connected to said first end 34a, e.g. said first jib hoist winch having a drum onto which said first end is wound, and a second jib hoist winch 33 is connected to said second end 34b, e.g. a second jib hoist winch having a drum onto which said second end is wound.

Figure 8:
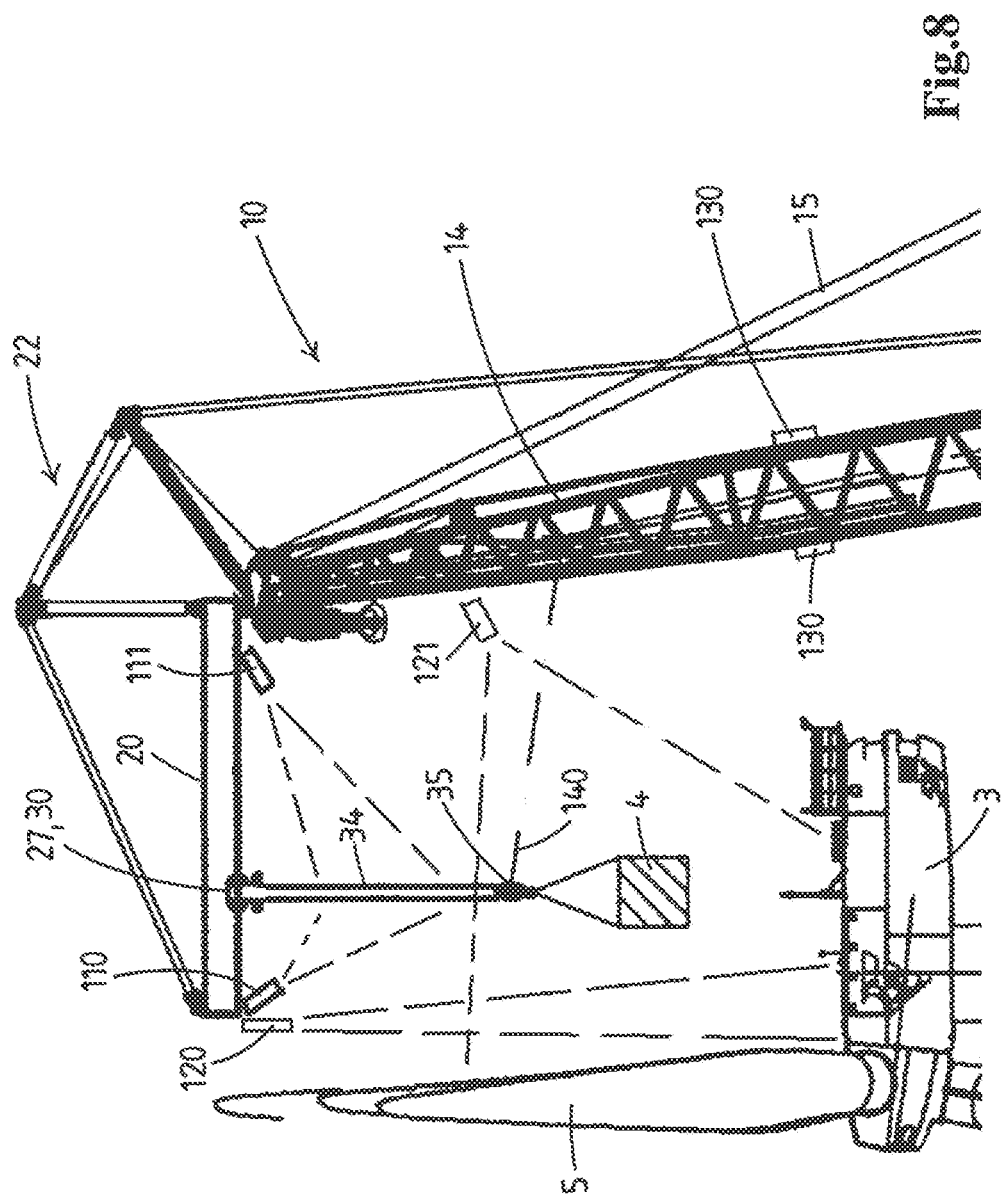
FIG. 8 illustrates the provision of one or more sensors.

FIG. 8 illustrates schematically that the crane 10 is provided with one or more jib cable orientation sensors, e.g. one or more camera's 110, 111, or inclination sensors, that are adapted to sense the actual orientation of one or more falls of the jib hoist cable 34 relative to the jib frame 20, e.g. in view of wind deflecting the object 4 and/or object connector member 35 from a position vertically below the mobile jib hoist cable suspension member 30.

FIG. 8 illustrates schematically that the crane 10 is provided with one or more nacelle position detectors 120, 121, that are adapted to sense the actual position of the nacelle 3, or part thereof, and/or one or more components in or on the nacelle 3 relative to the jib frame 20, e.g. wherein said nacelle position detectors comprises one or more radar devices, a LiDAR sensor system, and/or one or more camera's.

FIG. 8 illustrates schematically that the crane 10 is provided with one or more sensors that are adapted to sense an actual deflection of the main boom 14, e.g. one or more force sensors, e.g. strain gauges 130 fitted on the main boom.

In an embodiment the main boom is provided with one or more force sensors 130 that are configured to provide reference signals representative of actual load on the main boom 14, wherein the motion compensating support device controller, here controlling winches 48,49, 55, 56, is linked to said one or more force sensors 130 and configured to compute and provide control signals for said one or more motor powered motion displacement actuator assemblies on the basis of said reference signals of said one or more force sensors 130.

For example use is made of an optical fiber Bragg grating force sensor.

The force sensors may represent actual deflection and/or dynamic motion within the main boom 14, which is then taken into account by the motion compensating support device controller when it comes to controlling the one or more motor powered motion displacement actuator assemblies.

FIG. 8 illustrates schematically that the crane 10, e.g. the main boom 14, is provided with one or more tugger winches, e.g. in proximity of the tip end of the main boom and/or on the jib frame. Each tugger winch is provided with a tugger cable 140 attachable to the object 4 and/or to the object suspension device 35 that is suspended from the jib hoist cable 34.

Figure 9:
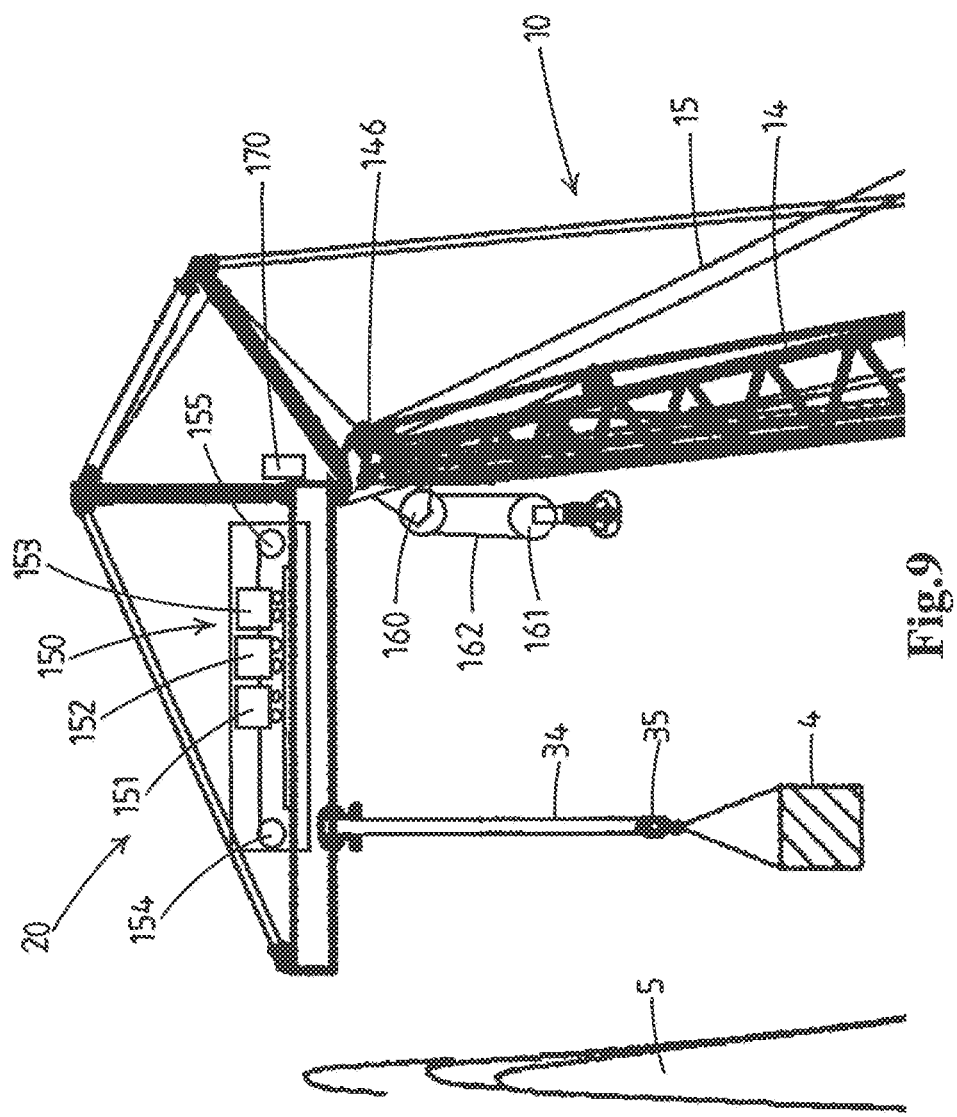
FIG. 9 illustrates the provision of an active damping mechanism.

FIG. 9 illustrates schematically that the crane 10 is provided with an active motion damping mechanism 150, that is mounted to the jib frame 20. In an alternative such a mechanism could be mounted to the main boom 14, e.g. in proximity of the tip 14b of the main boom 14.

The active motion damping mechanism 150 here, as an example, comprises a solid motion damping ballast, here of one or more, e.g. multiple interconnected, ballast members 151, 152, 153, e.g. each on a wheeled carrier travelling over a ballast guide rails, which ballast is movable in the motion damping direction relative to the jib frame 20. A damping ballast drive and control system, here with one or more winches 154, 155 and one or more cables connected to the solid ballast, is configured to cause and control the movements of the solid damping ballast 151,152,153. This may be done in response to output of a motion detection sensor 170, e.g. an inertial measurement device mounted on the jib frame and/or in proximity of the top of the main boom 14.

Depicted here is a motion damping ballast mechanism 150 that is configured to counteract undue motions in X-direction of the jib frame 20. In another embodiment, or additionally, a second motion damping mechanism with movable solid ballast can be arranged and configured to operate in Y-direction.

In an embodiment it is envisaged that the active motion damping mechanism 150 is operated in the relatively short time periods of pick-up and landing a load, e.g. of a component 4 that is removed from the nacelle or placed in the nacelle 3.

For example the e.g. the active motion damping mechanism 150 is releasably mounted to the jib frame 20 or to the main boom in proximity of the tip of the main boom, for example so that the effective hoist capacity can be enlarged by removal of the active motion damping mechanism when a heavy load needs to be handled.

In an embodiment an inertial measurement device 170 is mounted at the tip of the main boom or on the jib frame. This inertial measurement device provides one or more reference signals on the basis of which control signals for at least one of the motor powered X-motion displacement actuator assembly, the motor powered Y-motion displacement actuator assembly, and the Z-direction heave motion compensation device are computed and provided, each thereof being configured to independently control of the X motion of the mobile carrier, of the Y motion of the mobile jib hoist cable suspension member, and of the Z-direction heave motion compensation of the object suspension device. This arrangement, when appropriately construed, allows to compensate for motions of the jib frame and/or main boom, for example wind induced motion, sea state induced motion, vibrations in the main boom (e.g. resulting from shifting of the load suspended from the crane relative to the main boom), deflections of the main boom, etc. As explained the device 170 may, also or in the alternative, be configured to provide a control signal for an active motion damping mechanism 150.

Instead, or in combination with, the inertial measurement device 170 a GPS receiver can be provided, e.g. at the tip end of the main boom and/or on the jib frame.

FIG. 9 illustrates schematically that the crane 10 is provided with a main hoist system comprising a top sheaves assembly 160 arranged in proximity of the tip end 14b of the main boom 14, a main hoist block 161 having multiple sheaves, a main hoist cable 162 and a main hoist winch, e.g. on the housing 12a. The main hoist block 161 is suspended from the top sheaves assembly 160 by means of the main hoist cable in a multiple falls arrangement.

Figure 10:
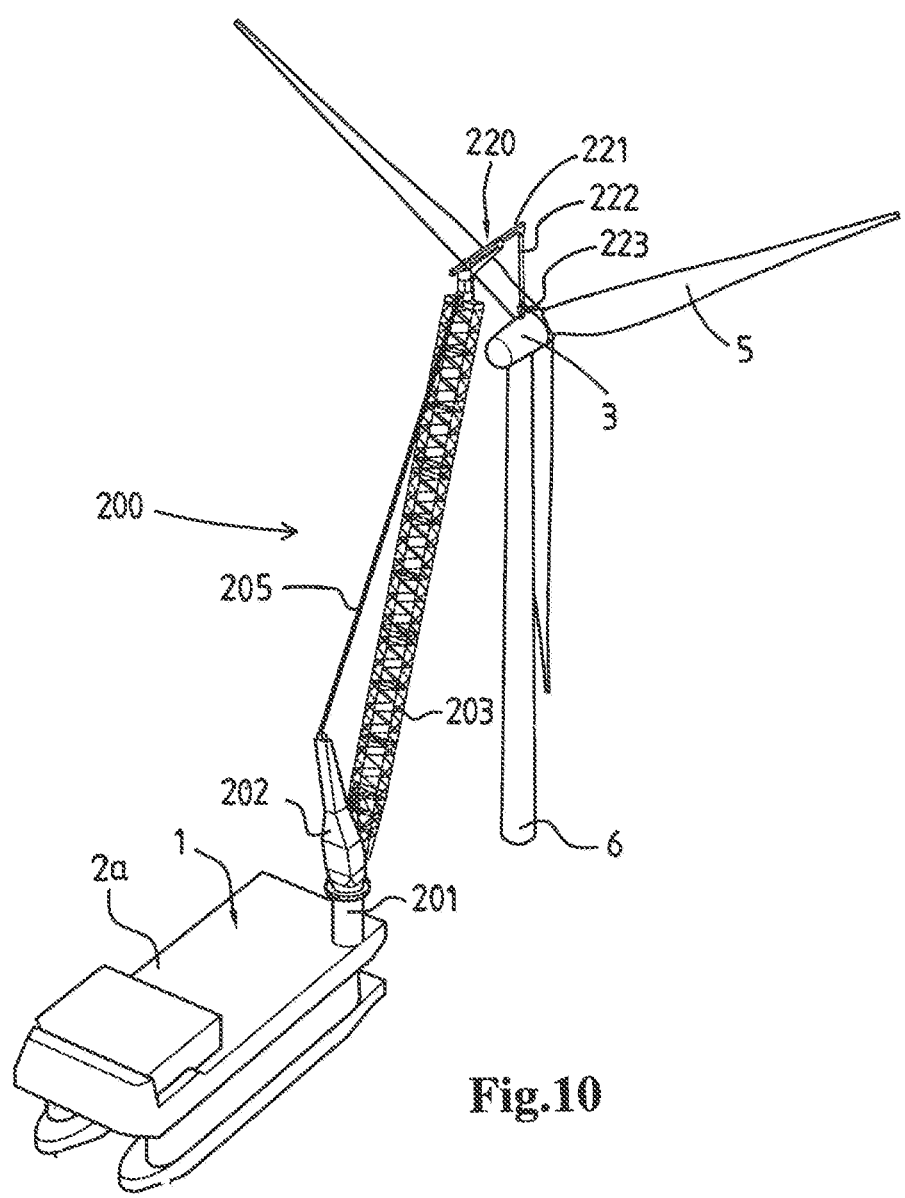
FIG. 10 illustrates a vessel and crane wherein one or more of the aspects of the invention can be implemented.

FIG. 10 illustrates a vessel 1 and crane 200 wherein one or more of the aspects of the invention, such as the second, third, fourth, fifth, sixth, seventh, and/or eight (or any combination thereof) can be implemented. The crane is described in detail in co-pending and PCT/NL2017/050812 which is incorporated by reference herein.

The vessel has a hull 2 with deck 2a.

The crane has a pedestal 201, a revolving superstructure 202, a main boom 203, a main boom luffing assembly 205. A motion compensating support device 220 with a level setting pedestal is mounted at the tip end of the main boom 203. A jib 221 thereof is rotatable about a vertical axis and extendable and retractable in radial direction relative to said vertical axis. A jib hoisting cable 222 extends to a load connector 223 that may serve to hoisting a load, e.g. a component to be placed in the nacelle of the depicted offshore wind turbine.

Figure 4:
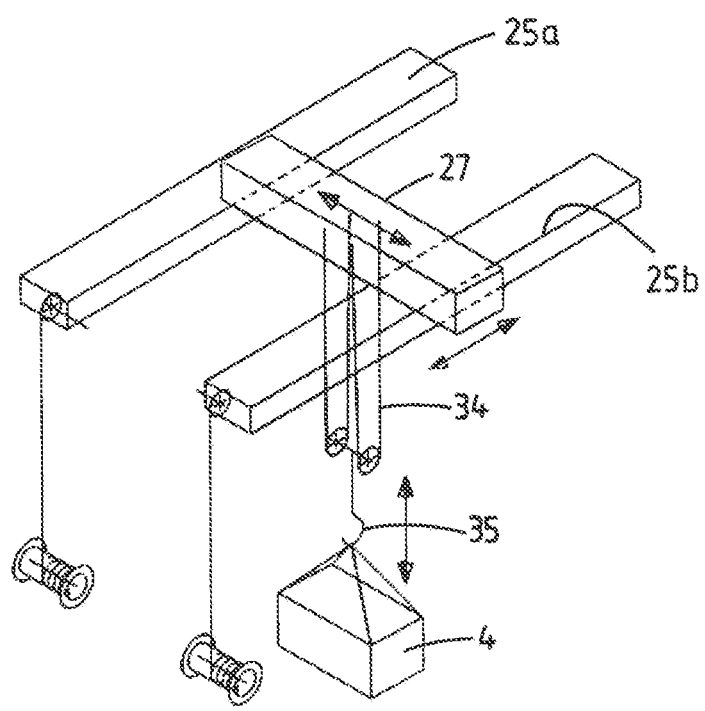
FIG. 4 shows a schematic explanation of the X, Y, Z compensation system of the crane of FIG. 1.
Figure 11:
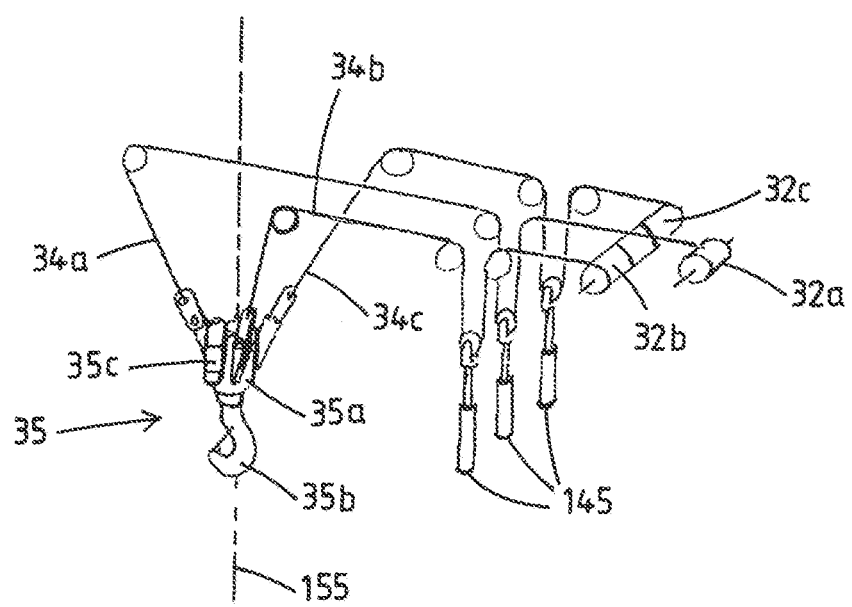
FIG. 11 illustrates an alternative arrangement of jib hoist winches and cables.

FIG. 11 illustrates an alternative arrangement of jib hoisting winch and jib hoisting cable, e.g. as alternative to the arrangement illustrated in FIGS. 4 and 7.

Here at least three jib hoist cables 34a,b,c extend each from a respective jib hoist winch 32a,b,c to the load connector 35, with the cables 34a,b,c, extending to define a reverse pyramid diverging upward from the load connector 35. This provides stability of the location of the load connector relative to the member 30 and could also be done with four jib hoist cables and winches in a reverse pyramidal arrangement of the four jib hoist cables. The respective jib hoist winches 32a,b,c may be mounted on the member 30 itself or at another location, e.g. on the frame 20 or on the main boom 14. For example the jib hoist winches 32a,b,c are embodied as AHC (active heave compensated) winch(es), or, as shown, a hoist heave compensation mechanism comprising a heave compensating cylinder 145 is configured to act on each jib hoist cable 34a,b,c.

In an embodiment the load connector 35, as illustrated here, comprises an upper part 35a suspended from one or more jib hoist cables 34a,b,c and a rotatable lower part 35b, e.g. a hook, that is configured to connect to the load and is rotatable relative to the upper part of the load connector about a vertical axis 155. This allows to rotate the object load around a vertical axis of the load connector. The rotating of the lower part relative to the upper part is controlled by means of the control device, e.g. a motorized rotation drive 35c if present, so that said rotating and thereby the actual angular position of the load 4 in its horizontal plane is controlled thereby. It will be appreciated that a rotation of the lower part 35a may be controlled with the aid of one or more of the sensors, cameras, etc. as described herein.

The invention claimed is:

1. A motion compensating crane for use on an offshore vessel in floating condition having a hull with a design waterline, wherein the crane comprises:
   a main boom pivotally connected at an inner end thereof about a substantially horizontal boom pivot axis, said main boom having a tip end remote from said inner end;
   a main boom luffing assembly adapted to set an angle of the main boom within a main boom working angle range, wherein the main boom has a length and a main boom working angle range such that the tip end thereof is positionable in a position wherein the tip end is at least 100 meters above the design waterline of the hull of the vessel;
   a rigid jib frame pivotally connected to the tip end of the main boom about a substantially horizontal jib frame pivot axis;
   a level setting assembly adapted to set the rigid jib frame in a levelled position whilst the main boom has any angle within said main boom working angle range, wherein the rigid jib frame is provided with one or more X-direction tracks that each extend perpendicular to the horizontal jib frame pivot axis and which are each substantially horizontal in said levelled position of the rigid jib frame;
   a mobile carrier supported by said one or more X-direction tracks and movable relative thereto in an X direction;
   a motor powered X-motion displacement actuator assembly adapted to move said mobile carrier in said X-direction relative to said one or more X-direction tracks, wherein the mobile carrier is provided with one or multiple parallel Y-direction tracks that extend perpendicular to said X-direction tracks;
   a mobile jib hoist cable suspension member supported by said one or more Y-direction tracks and movable relative thereto in an Y direction;
   a motor powered Y-motion displacement actuator assembly adapted to move said mobile jib hoist cable suspension member in said Y-direction relative to said one or more Y-direction tracks;
   a jib hoist winch and a jib hoist cable driven by said jib hoist winch, which jib hoist cable depends from said mobile jib hoist cable suspension member, wherein an object suspension device is suspended from said jib hoist cable; and
   a Z-direction heave motion compensation device that acts on the jib hoist cable and is integrated in the jib hoist winch and/or comprises a jib hoist cable engaging member that is arranged and adapted to act on the jib hoist cable.

2. The motion compensating crane according to claim 1, wherein the motor powered X-motion displacement actuator assembly comprises an X-direction winch and cable assembly comprising a first X-direction cable attached to the mobile carrier at a first attachment point thereof in proximity of a first X-direction track of the rigid jib frame, and a second X-direction cable attached to the mobile carrier at a second attachment point thereof in proximity of a second X-direction track of the rigid jib frame, wherein the X-direction winch and cable assembly comprises a motor powered X-direction winch having a rotatable winch drum with first, second, third, and fourth drum sections, wherein a first end of the first X-direction cable is wound onto said first drum section, wherein a second end of the first direction cable is wound onto said second drum section in opposite sense to the winding of the first end of the first X-direction cable, and wherein a first end of the second X-direction cable is wound onto said third section, and wherein a second end of the second X-direction cable is wound onto said fourth section in opposite sense to the winding of the first end of the second X-direction cable.

3. The motion compensating crane according to claim 1, wherein the motor powered Y-motion displacement actuator assembly comprises a Y-direction winch and cable assembly, comprising at least one Y-direction cable connected to the mobile hoisting cable suspension member and an associated winch so as to move said mobile hoisting cable suspension member in said Y-direction relative to said one or more Y-direction tracks.

4. The motion compensating crane according to claim 3, wherein the Y-direction winch and cable assembly has a single Y-direction cable that is attached to said mobile hoisting cable suspension member and an associated motor power Y-direction winch having a rotatable winch drum with a first and section drum section, wherein a first end of the single Y-direction cable is wound onto said first drum section and wherein a second end of the single Y-direction cable is wound onto said second drum section in opposite sense to the winding of the first end of the Y-direction cable.

5. The motion compensating crane according to claim 1, wherein the jib hoist cable has a first and second end, wherein the mobile jib hoist cable suspension member comprises a first top sheave and a second top sheave each having a horizontal sheave axis, wherein the object suspension member comprises a first bottom sheave, and wherein said jib hoist cable extends in a double fall arrangement between said first and second top sheaves and said first bottom sheave.

6. The motion compensating crane according to claim 1, wherein the mobile jib hoist cable suspension member comprises a first top sheave, a second top sheave, a third top sheave and a fourth top sheave, wherein the mobile carrier is provided with first and second cable guiding sheaves at opposite locations thereon seen in Y-direction,
wherein the jib hoist cable passes from a first end thereof in a positive X-direction to said first cable guiding sheave on the mobile carrier, and then from said first cable guiding sheave on the mobile carrier to the first top sheave, via a first bottom sheave to the second top sheave, and from the second top sheave to the second cable guiding sheave on the mobile carrier, wherein the rigid jib frame is provided with third and fourth cable guiding sheaves, each in proximity of an end of a respective second and first X-direction track of the rigid jib frame, and wherein the jib hoist cable extends from the second cable guiding sheave on the mobile carrier in said positive X-direction to said third cable guiding sheave on said rigid jib frame, and from said third cable guiding sheave to said fourth cable guiding sheave,
wherein the mobile carrier is further provided with fifth and sixth cable guiding sheaves, the fifth cable guiding sheave in proximity of the first cable guiding sheave and the sixth cable guiding sheave in proximity of the second cable guiding sheave,
wherein the jib hoist cable extends from said fourth cable guiding sheave on the rigid jib frame in a negative X-direction to the fifth cable guiding sheave on the mobile carrier and passes from the fifth cable guiding sheave to the third top sheave, down to the second bottom sheave and up to the fourth top sheave, and from said fourth top sheave to the sixth cable guiding sheave,
wherein the jib hoist cable extends from said sixth cable guiding sheave in a negative X-direction to said second end of the hoisting cable, and
wherein at least one of said first and second ends of the jib hoist cable is connected to a hoisting winch.

7. An offshore vessel having a hull with a design waterline, wherein the vessel is provided with the crane according to claim 1, wherein a base structure is fixed to said vessel so that said base structure forms a unit with said hull of said vessel that is subjected to wave-induced motion.

8. The vessel according to claim 7, wherein the vessel is a semi-submersible vessel having two parallel submergible pontoons, columns extending upwards from each of said pontoons, and a deck box structure supported by the columns, the deck box structure having a deck, the base structure being fixed to said deck.

9. The vessel according to claim 8, wherein the vessel has a bow and a stern, wherein the vessel has a crew and bridge superstructure at the bow of the vessel and wherein the vessel has a deck aft of said crew and bridge superstructure, and wherein the crane is mounted at the stern of the vessel.

10. The vessel according to claim 8, wherein the crew and bridge superstructure is arranged asymmetrically at said bow of the vessel, and wherein the crane is arranged asymmetrically at the stern of the vessel, opposite from a centreline of the vessel relative to the crew and bridge superstructure.

11. The vessel according to claim 7, wherein the vessel has a bow and a stern, wherein the vessel has a crew and bridge superstructure at the bow of the vessel and wherein the vessel has a deck aft of said crew and bridge superstructure, and wherein the crane is mounted at the stern of the vessel.

12. The vessel according to claim 7, wherein the crew and bridge superstructure is arranged asymmetrically at said bow of the vessel, and wherein the crane is arranged asymmetrically at the stern of the vessel, opposite from a centreline of the vessel relative to the crew and bridge superstructure.

13. A method for hoisting a component wherein use is made of the vessel according to claim 7, said method comprising pick-up or landing of the component whilst the vessel is in floating condition and subjected to wave induced motion, wherein said method comprises:
operating said motor powered X-motion displacement actuator assembly, said motor powered Y-motion displacement actuator assembly, and said Z-direction heave motion compensation device in order to compensate for said wave induced motion.

14. A motion compensating crane for use on an offshore vessel having a hull with a design waterline, wherein the crane comprises:
a base structure adapted to be secured to the hull of the vessel;
a revolving superstructure mounted on the base structure and adapted to revolve about a substantially vertical revolving axis relative to the base structure;
a slew drive adapted to revolve said superstructure;
a main boom mounted to the revolving superstructure and pivotally connected at an inner end thereof about a substantially horizontal boom pivot axis to the revolving superstructure, said main boom having a tip end remote from said inner end;
a main boom luffing assembly adapted to set an angle of the main boom relative to the superstructure within a main boom working angle range, wherein the main boom has a length and a main boom working angle range such that the tip end thereof is positionable in a position wherein the tip end is at least 100 meters above the design waterline of the hull of the vessel;

a rigid jib frame pivotally connected to the tip end of the main boom about a substantially horizontal jib frame pivot axis;

a level setting assembly adapted to set the rigid jib frame in a levelled position whilst the main boom has any angle within said main boom working angle range, wherein the rigid jib frame is provided with a set of parallel X-direction tracks that extend perpendicular to the horizontal jib frame pivot axis and which are substantially horizontal in said levelled position of the rigid jib frame;

a mobile carrier supported by said X-direction tracks and movable relative thereto in an X direction;

a motor powered X-motion displacement actuator assembly adapted to move said mobile carrier in said X-direction relative to said X-direction tracks, wherein the mobile carrier is provided with one or multiple parallel Y-direction tracks that extend perpendicular to said X-direction tracks;

a mobile jib hoist cable suspension member supported by said one or more Y-direction tracks and movable relative thereto in an Y-direction;

a motor powered Y-motion displacement actuator assembly adapted to move said mobile jib hoist cable suspension member in said Y-direction relative to said one or more Y-direction tracks;

a jib hoist winch and a jib hoist cable driven by said hoist winch, which jib hoist cable depends from said mobile jib hoist cable suspension member, wherein an object suspension device is suspended from said jib hoist cable; and a Z-direction heave motion compensation device that acts on the jib hoist cable and is integrated in the jib hoist winch and/or comprises a jib hoist cable engaging member that is arranged and adapted to act on the jib hoist cable intermediate the hoist winch object suspension device suspended from the jib hoist cable.

15. The motion compensating crane according to claim 14, wherein the motor powered X-motion displacement actuator assembly comprises an X-direction winch and cable assembly comprising a first X-direction cable attached to the mobile carrier at a first attachment point thereof in proximity of a first X-direction track of the rigid jib frame, and a second X-direction cable attached to the mobile carrier at a second attachment point thereof in proximity of a second X-direction track of the rigid jib frame, wherein the X-direction winch and cable assembly comprises a motor powered X-direction winch having a rotatable winch drum with first, second, third, and fourth drum sections, wherein a first end of the first X-direction cable is wound onto said first drum section, wherein a second end of the first direction cable is wound onto said second drum section in opposite sense to the winding of the first end of the first X-direction cable, and wherein a first end of the second X-direction cable is wound onto said third section, and wherein a second end of the second X-direction cable is wound onto said fourth section in opposite sense to the winding of the first end of the second X-direction cable.

16. The motion compensating crane according to claim 14, wherein the motor powered Y-motion displacement actuator assembly comprises a Y-direction winch and cable assembly, comprising at least one Y-direction cable connected to the mobile hoisting cable suspension member and an associated winch so as to move said mobile hoisting cable suspension member in said Y-direction relative to said one or more Y-direction tracks.

17. The motion compensating crane according to claim 14, wherein the jib hoist cable has a first and second end, wherein the mobile jib hoist cable suspension member comprises a first top sheave and a second top sheave each having a horizontal sheave axis, wherein the object suspension member comprises a first bottom sheave, and wherein said jib hoist cable extends in a double fall arrangement between said first and second top sheaves and said first bottom sheave.

18. The motion compensating crane according to claim 14, wherein the mobile jib hoist cable suspension member comprises a first top sheave, a second top sheave, a third top sheave, and a fourth top sheave, wherein the mobile carrier is provided with first and second cable guiding sheaves at opposite locations thereon seen in Y-direction, wherein the jib hoist cable passes from a first end thereof in a positive X-direction to said first cable guiding sheave on the mobile carrier, and then from said first cable guiding sheave on the mobile carrier to the first top sheave, via a first bottom sheave to the second top sheave, and from the second top sheave to the second cable guiding sheave on the mobile carrier, wherein the rigid jib frame is provided with third and fourth cable guiding sheaves, each in proximity of an end of a respective second and first X-direction track of the rigid jib frame, and wherein the jib hoist cable extends from the second cable guiding sheave on the mobile carrier in said positive X-direction to said third cable guiding sheave on said rigid jib frame, and from said third cable guiding sheave to said fourth cable guiding sheave, wherein the mobile carrier is further provided with fifth and sixth cable guiding sheaves, the fifth cable guiding sheave in proximity of the first cable guiding sheave and the sixth cable guiding sheave in proximity of the second cable guiding sheave, wherein the jib hoist cable extends from said fourth cable guiding sheave on the rigid jib frame in a negative X-direction to the fifth cable guiding sheave on the mobile carrier and passes from the fifth cable guiding sheave to the third top sheave, down to the second bottom sheave and up to the fourth top sheave, and from said fourth top sheave to the sixth cable guiding sheave, wherein the jib hoist cable extends from said sixth cable guiding sheave in a negative X-direction to said second end of the hoisting cable, and wherein at least one of said first and second ends of the jib hoist cable is connected to a hoisting winch.

19. An offshore vessel having a hull with a design waterline, wherein the vessel is provided with a crane according to claim 14, wherein the base structure is fixed to said vessel so that said base structure forms a unit with said hull of said vessel that is subjected to wave-induced motion.

* * * * *